(12) United States Patent
Di Trapani

(10) Patent No.: US 10,352,534 B2
(45) Date of Patent: Jul. 16, 2019

(54) LIGHTING SYSTEM

(71) Applicant: CoeLux S.r.l., Lomazzo (CO) (IT)

(72) Inventor: Paolo Di Trapani, Cavallasca (IT)

(73) Assignee: CoeLux S.r.l., Como (IT)

( * ) Notice: Subject to any disclaimer, the term of this patent is extended or adjusted under 35 U.S.C. 154(b) by 75 days.

(21) Appl. No.: 15/253,161

(22) Filed: Aug. 31, 2016

(65) Prior Publication Data

US 2017/0051893 A1 Feb. 23, 2017

Related U.S. Application Data

(63) Continuation of application No. PCT/EP2014/000835, filed on Mar. 27, 2014.

(30) Foreign Application Priority Data

Mar. 10, 2014 (EP) .................................... 14000835

(51) Int. Cl.
*F21S 8/02* (2006.01)
*F21V 9/02* (2018.01)
(Continued)

(52) U.S. Cl.
CPC ................ *F21V 9/02* (2013.01); *F21S 8/024* (2013.01); *F21S 8/026* (2013.01); *F21S 8/04* (2013.01);
(Continued)

(58) Field of Classification Search
CPC .......... F21V 9/02; F21V 7/0008; F21V 13/02; F21V 21/02; F21V 21/03; F21V 9/04;
(Continued)

(56) References Cited

U.S. PATENT DOCUMENTS 8,068,285 B1 11/2011 Flynn
2010/0237760 A1* 9/2010 Yang .................... F21K 9/00
313/46

(Continued)

FOREIGN PATENT DOCUMENTS

CN 203010375 U 6/2013
DE 202012101697 U1 7/2012
(Continued)

OTHER PUBLICATIONS

International Search Report and Written Opinion, counterpart International Application No. PCT/EP2014/000835, dated Feb. 19, 2015, 13 total pages.
(Continued)

*Primary Examiner* — Bao Q Truong
(74) *Attorney, Agent, or Firm* — DiBerardino McGovern IP Group LLC

(57) ABSTRACT

A lighting system comprises a light source for providing a light beam of directed non-diffused light with a first correlated color temperature along a main light beam direction; and a lamp shade-like structure comprising a bottom unit to be illuminated from the light source at one side and a screen structure provided at an opposite side, the bottom unit and the screen structure defining a light passage. The bottom unit comprises a diffused light generator for generating diffused light at a second correlated color temperature, which is larger than the first correlated color temperature, is at least partially transparent for the directed non-diffused light of the light beam, and is configured such that at least a divergent light beam portion of the light beam enters the light passage; and the screen structure is spatially oriented with respect to the main light beam direction of the divergent light beam portion.

20 Claims, 7 Drawing Sheets

(51) Int. Cl.
  *F21S 8/04* (2006.01)
  *F21V 7/00* (2006.01)
  *F21V 13/02* (2006.01)
  *G02B 5/02* (2006.01)
(52) U.S. Cl.
  CPC ............ *F21V 7/0008* (2013.01); *F21V 13/02* (2013.01); *G02B 5/0273* (2013.01)
(58) Field of Classification Search
  CPC .. F21V 9/06; F21V 21/00; F21V 21/04; F21S 8/024; F21S 8/026; F21S 8/04; F21S 8/02; G02B 5/0273
  See application file for complete search history.

(56) References Cited

U.S. PATENT DOCUMENTS

| | | | |
|---|---|---|---|
| 2011/0194270 | A1 | 8/2011 | Di Trapani et al. |
| 2011/0216642 | A1 | 9/2011 | Chou et al. |
| 2012/0320626 | A1 | 12/2012 | Quilici et al. |
| 2013/0026513 | A1 | 1/2013 | Aurongzeb et al. |
| 2014/0133125 | A1* | 5/2014 | Di Trapani ........... F21V 3/0625 362/2 |
| 2016/0363777 | A1 | 12/2016 | Flynn et al. |
| 2017/0074486 | A1 | 3/2017 | Flynn et al. |

FOREIGN PATENT DOCUMENTS

| | | |
|---|---|---|
| EP | 2034234 A1 | 3/2009 |
| GB | 2450192 C | 12/2008 |
| JP | 2004161841 A | 6/2004 |
| JP | 2008053049 A | 3/2008 |
| JP | 2009064637 A | 3/2009 |
| JP | 2010118187 A | 5/2010 |
| JP | 2011114086 A | 6/2011 |
| RU | 2182287 C2 | 5/2002 |
| SU | 457365 A1 | 8/1987 |
| WO | 2009156347 A1 | 12/2009 |
| WO | 2009156348 A1 | 12/2009 |
| WO | 2014075721 A1 | 5/2014 |
| WO | 2014076217 A1 | 5/2014 |
| WO | 2014076218 A1 | 5/2014 |
| WO | 2014076656 | 5/2014 |
| WO | 2015036057 A1 | 3/2015 |

OTHER PUBLICATIONS

Office Action, counterpart Japanese Patent Application No. 2015-046221, dated Apr. 5, 2016, 14 total pages (including English translation of 7 pages).

Office Action, counterpart European Patent Application No. 15158278.0, dated Sep. 12, 2016, 5 total pages.

Extended European Search Report, counterpart European Patent Application No. 15158278.0, dated Jul. 14, 2015, 7 total pages.

Office Action, counterpart Chinese Patent Application No. 201510104978.7, dated Nov. 15, 2016, 10 total pages.

Office Action, counterpart Korean Patent Application No. 10-2015-0033253, dated Nov. 14, 2016, 14 total pages (including English translation of 6 pages).

Notice of Allowance, counterpart Russian Patent Application No. 2016139406/07(062877), dated Mar. 27, 2018, 7 total pages.

\* cited by examiner

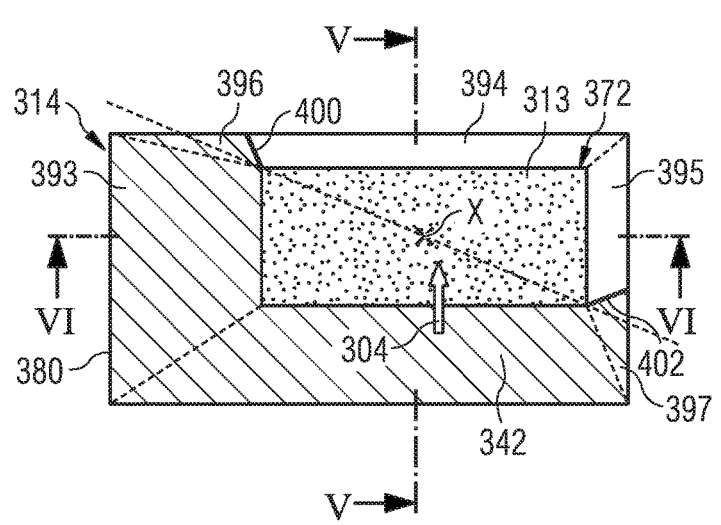
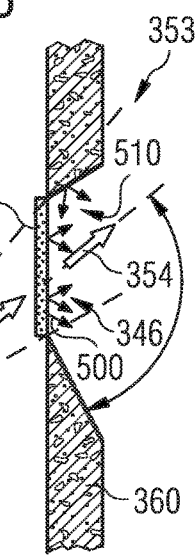
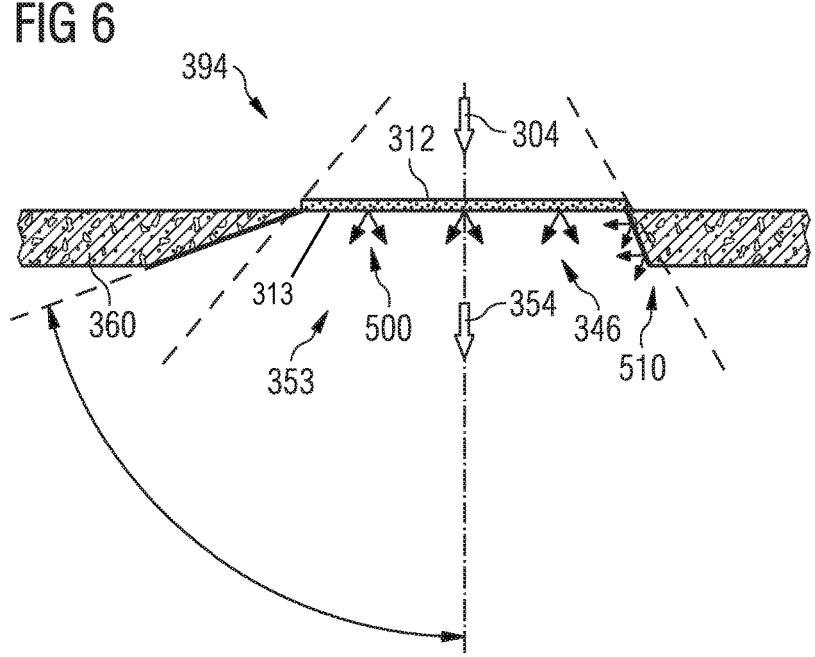

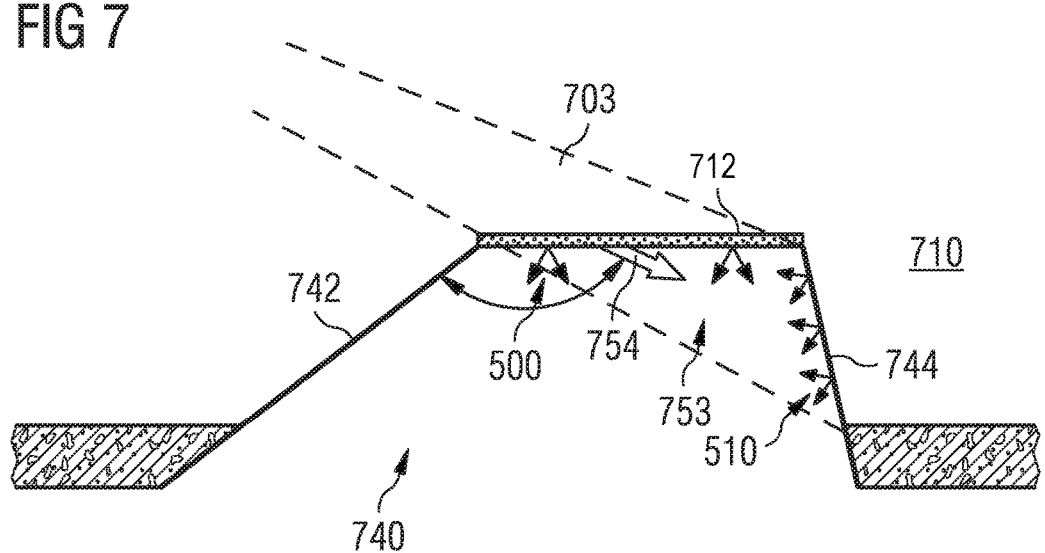
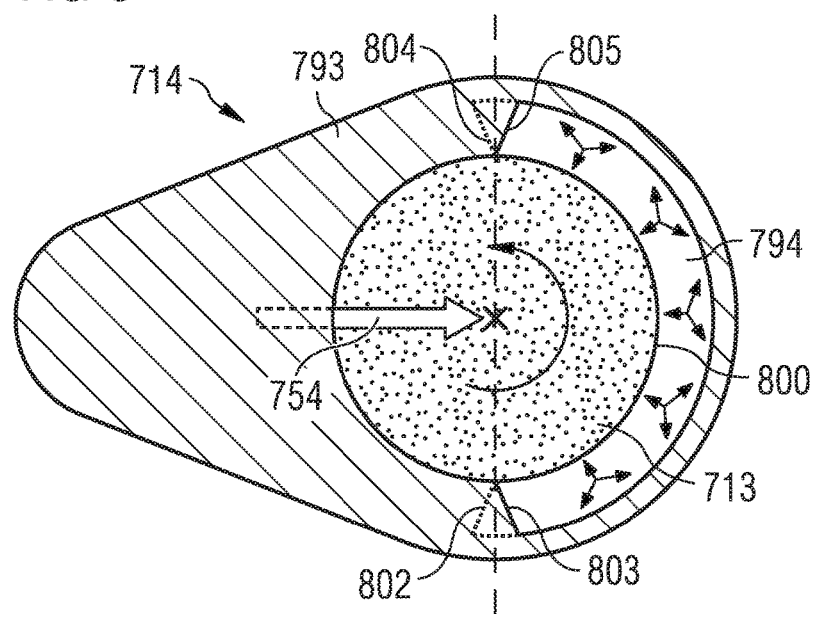

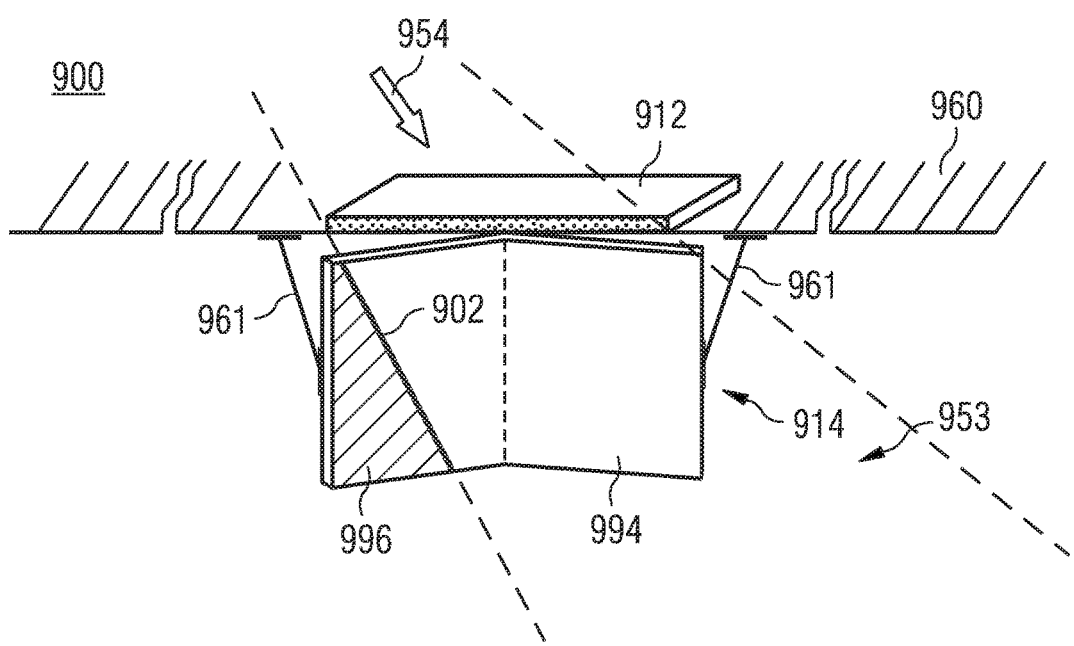

LIGHTING SYSTEM

CROSS REFERENCE TO RELATED APPLICATIONS

This application is a continuation of and claims priority under 35 U.S.C. § 120 to International Application PCT/EP2014/000835, with an international filing date of Mar. 27, 2014, which claims priority to European Application No. 14 000 835.0, filed on Mar. 10, 2014. Both of these applications are incorporated herein by reference in their entirety.

TECHNICAL FIELD

The present disclosure relates generally to a lighting system, in particular to a lighting system for imitating natural sunlight illumination. Moreover, the present disclosure relates generally to implementing such a lighting system in a building and specifically in a ceiling or wall of a building. Moreover, the present disclosure relates to ceiling configurations imitating natural sunlight illumination.

BACKGROUND

Artificial lighting systems for closed environments often aim at improving the visual comfort experienced by users. In particular, lighting systems are known which simulate natural lighting, specifically sunlight illumination. The characteristics of the to be imitated outdoor lighting depend on the interaction between the sunlight and the earth atmosphere and create a specific shade characteristic.

EP 2 304 478 A1 and EP 2 304 480 A1, filed by the same applicant, disclose a lighting system with a light source producing visible light, and a panel containing nanoparticles. During operation of the lighting system, the panel receives the light from the light source and acts as a so-called Rayleigh diffuser, namely it diffuses light rays similarly to the earth atmosphere in clear-sky conditions. Specifically, the concept uses directed light with low correlated color temperature (CCT), which corresponds to sunlight and generates shadows in presence of lit objects, and diffused light with larger CCT, which corresponds to the light of the blue sky and, in principal, can generate shadows with a blue tinge.

SUMMARY OF THE DISCLOSURE

In a first aspect, the present disclosure is directed to a lighting system comprising a light source for providing a light beam of directed non-diffused light with a first correlated color temperature along a main light beam direction, wherein a propagation direction of the directed non-diffused light is modified across the light beam and is essentially parallel to the main light beam direction in an inner area and is increasingly inclined with respect to the main light beam direction with increasing distance from the inner area; and a lamp shade-like structure comprising a bottom unit to be illuminated from the light source at one side and a screen structure provided at an opposite side (herein also referred to as opposing side), the bottom unit and the screen structure defining a light passage. Moreover, the bottom unit comprises a diffused light generator for generating diffused light at a second correlated color temperature, which is larger than the first correlated color temperature, is at least partially transparent for the directed non-diffused light of the light beam, and is configured such that at least a divergent light beam portion of the light beam enters the light passage, and the screen structure is spatially oriented with respect to the main light beam direction of the divergent light beam portion to be illuminated by at least a part of the divergent light beam portion, thereby providing an illuminated screen section acting as a scattered light source.

Implementations can include one or more of the following features. For example, the screen structure can include a non-illuminated screen section, which is not directly illuminated by the divergent light beam portion during operation of the light source. The non-illuminated screen section can be arranged at one azimuthal side or both azimuthal sides of the illuminated screen section. During operation of the lighting system, a shadow/light transition line can be formed between the non-illuminated screen section and the illuminated screen section. The divergent light beam portion can be completely blocked by the screen structure such that only scattered light exits the light passage of the lamp shade-like structure. The illuminated screen section can be surrounded by the non-illuminated screen section or boarders to the bottom unit and the non-illuminated screen section.

The screen structure can be configured as a funnel-like structure that diverges in a downstream direction within a light passage of the screen structure more than the divergent light beam portion. An extension of the screen structure in an azimuthal direction around the main light beam direction of the divergent light beam portion, as it enters the light passage, and/or the spatial orientation of the screen structure with respect to the divergent light beam portion is selected such that the illuminated screen section extends partly in an azimuthal direction around the main light beam direction when the divergent light beam portion enters the light passage and, for example, may increase or decrease during propagation within light passage, for example, to maintain the natural sunlight impression.

The screen structure can include a non-illuminated screen section that is not directly illuminated by the divergent light beam portion during operation of the light source. The non-illuminated screen section can be arranged at one azimuthal side or both azimuthal sides of the illuminated screen section. During operation of the lighting system, a shadow/light transition line can be formed between the non-illuminated section and the illuminated screen section.

The divergent light beam portion can be blocked or completely blocked by the screen structure such that only scattered light exits the light passage of the lamp shade-like structure. The illuminated screen section can be surrounded by the non-illuminated screen section or boarders to the bottom unit and the non-illuminated screen section.

The screen structure can include, at least within the illuminated screen section, a light scattering surface having a low absorption property with respect to one or more of: the directed non-diffuse light of the divergent light beam portion, the diffused light of the diffused light generator, and the diffused light of the screen structure itself. The screen structure can include, at least within the illuminated screen section, a light scattering surface featured by non-isotropic diffuse reflectance, for example, a diffuse reflectance peaked around the direction of specular reflection, for example, the scattered light distribution has a peak of a full width half maximum angle not larger than 120°, for example, 90°, and preferably 60°.

The lamp shade-like structure can be integrated in a ceiling or wall of a building and forms a lightwell. The lightwell can extend from an aperture, which can be formed in the ceiling or wall, into the ceiling or wall. A bottom face of the lightwell can be formed by the diffused light generator. A side wall of the lightwell can extend from the bottom face to the aperture, thereby forming the illuminated screen section and/or a non-illuminated screen section.

An angle of the side wall forming the non-illuminated screen section with respect to the main light beam direction of the divergent light beam portion can be larger than the angle of the side wall forming the illuminated screen section with respect to the main light beam direction of the divergent light beam portion. The screen structure can be asymmetric with respect the main light beam direction of the divergent light beam portion and/or with respect to the aperture.

The light passage can be delimited by the bottom unit in a preset geometrical shape, such as, for example, a rectangular shape. The screen structure can include at least one face that faces towards the divergent light beam portion. The screen structure can include at least one face that faces away from the divergent light beam portion.

The diffused light generator can be configured to substantially transmit light in the visible range and to scatter more efficiently the short-wavelengths components with respect to the long-wavelength components of the light beam. The diffused light generator can include a matrix of a first material in which first particles of a second material are dispersed, the first and second materials having, respectively, a first and a second refractive indexes, the first particles having diameters such that the product of said diameters times the first refractive index is in the range 5 nanometers (nm) to 350 nm.

The light source can be a light source having a divergence in the range from 5° to 50°, for example, having two different divergences in two orthogonal directions that are adapted for illumination of a rectangular diffused light generator. The light source can be a light source having, for example, a divergence in one direction of 5° to 15° (such as) 10° and a divergence in an orthogonal direction to the one direction of 20° to 40° (such as 30°). The light source can include, as a largest optical element for the light beam of directed non-diffused light upstream of the diffused light generator, a collimation optics (2A, FIGS. 1 and 10) that extends in a plane orthogonal to the main light beam direction over an area that is smaller than the extension of the diffused light generator when projected onto the plane orthogonal to the main light beam direction. For example, the area is 60% or less such as 50%, or 30% or less such as 20%, or even 15% or less such as 10% or 5% of the area of the projection of the diffused light generator onto the plane orthogonal to the main light beam direction.

The light source and the density of the particle distribution across the diffused light generator can be selected such that the product between the density and the illuminance provided by the light source during operation of the lighting system on the diffused light generator is substantially constant on the diffused light generator.

The diffused light generator can have a panel shape and/or include a film applied onto a substrate.

The diffused light generator can receive light from a second light source to be scattered within the diffused light generator to provide for scattered light.

In another aspect, a plurality of lighting systems of the above described type is disclosed, wherein each lighting system is characterized during operation by at least one contrast line, and the lighting systems are arranged with respect to each other such that a selection of contrast lines are parallel or are at least perceived as being parallel by an observer.

In another aspect, a lighting system comprises a light source for providing a light beam of directed non-diffused light with a first correlated color temperature along a main light beam direction, and a lamp shade-like structure comprising a planar front cover with an aperture, a bottom unit, and a screen structure, wherein the bottom unit is positioned to be illuminated from the light source at one side. The bottom unit and the screen structure define a light passage extending from an opposite side of the bottom unit to the aperture, wherein the bottom unit comprises a diffused light generator for generating diffused light at a second correlated color temperature, which is larger than the first correlated color temperature, is at least partially transparent for the directed non-diffused light of the light beam, and is configured such that at least a, for example divergent, light beam portion of the light beam enters the light passage. Furthermore, the diffused light generator is inclined (tilted) with respect to the planar front cover.

Implementations can include one or more of the following features. For example, the tilt angle ($\alpha t$) between the normal of the diffused light generator and the normal of the planar front cover can be in the range from 5° to 80°, for example, in the range from 10° to 60° such as 30°, 40°, or 50°. In a cross-section along a plane extending orthogonal to the diffused light generator and through the light source, prior incidence on the diffused light generator, the main light beam direction can be inclined with respect to the normal direction of the planar front cover by an incident angle ($\alpha i$) set in an angular range from 10° to 80° such as 40°, 50°, or 60°.

The normal direction of a plane defined by the diffused light generator can be inclined with respect to the normal direction of the planar front cover by a tilt angle ($\alpha t$) set smaller than the incident angle, for example, set in an angular range from 15° to 75° such as 40°, 50°, or 60°.

The screen structure can include a lit-up face that, in the cross-section, is inclined with respect to the main light beam direction at a first screen angle ($\alpha s$) set in an angular range from 0° to 90°, for example at the incident angle ($\alpha i$). The screen structure can include a not directly illuminated surface that, in the cross-section, is inclined with respect to the main light beam direction at a second screen angle being the size of the incident angle ($\alpha i$) or larger. The normal direction of the not directly illuminated surface, in the cross-section, can be inclined with respect to the normal direction of the planar front cover within the range from the tilt angle ($\alpha t$) to 90°. In a cross-section along a plane extending orthogonal the diffused light generator and through the light source, the diffused light generator can border the planar front cover.

The light source can be displaced with respect to the bottom unit in a direction parallel to the planar front cover and/or can have a distance to the planar front cover comparable to or larger than the distance from the bottom unit to the planar front cover.

A propagation direction of the directed non-diffused light can be essentially constant across the light beam. The lighting system can be configured as a composite lighting module such as a lighting tile.

In another aspect, a lighting unit comprises a plurality of lighting systems as recited above, and/or a lighting unit comprises a plurality of lighting systems, each comprising a light source for providing a light beam of directed non-diffused light with a first correlated color temperature along a main light beam direction; and a lamp shade-like structure comprising a planar front cover with an aperture, a bottom unit, and a screen structure, wherein the bottom unit is positioned to be illuminated from the light source at one side, and the bottom unit and the screen structure define a light passage extending from an opposite side of the bottom unit to the aperture, wherein the bottom unit comprises a diffused light generator for generating diffused light at a second correlated color temperature, which is larger than the first correlated color temperature, is at least partially transparent for the directed non-diffused light of the light beam, and is configured such that at least a, for example, divergent light beam portion of the light beam enters the light passage. In those lighting units, the lighting systems are substantially identical and the lighting systems are arranged within the lighting unit in a spatial orientation that is substantially identical for all lighting systems.

Implementations can include one or more of the following features. For example, each lighting system can be characterized during operation by at least one contrast line, and the lighting systems can be arranged with respect to each other such that respective contrast lines are parallel or are at least perceived as being parallel by an observer. Each lighting system can be configured such that the direct non-diffused light of each of the lighting systems is completely blocked by the screen structure. Each lighting system can be configured such that the direct non-diffused light of each of the lighting systems do not overlap within a room being illuminated with the lighting unit. Each lighting system can be configured such that the screen structure is positioned and dimensioned such that—although the direct non-diffused light of each of the lighting systems may not be completely blocked by the screen structure—at least within a selected range of positions, only a single light source is visible to an observer within a room being illuminated with the lighting unit.

The lighting systems can be integrated in a ceiling or a wall of a building and respectively form a lightwell. The lighting unit can be configured as a ceiling unit.

The position of any one of the plurality of lighting systems with respect to any other one of the plurality of lighting systems can be obtained by a spatial-translation rigid transformation.

Each lighting system of the plurality of lighting systems can be configured such that the direct non-diffused light of each of the lighting systems partly passes the screen structure, thereby generating a divergent light beam portion. The lighting systems can be arranged at a distance with respect to each other and/or provided with a divergence such that the divergent light beam portions of each of the neighboring lighting systems are non-overlapping over a propagation length of at least 1.5 m, for example, at least 2.5 m, or at least 4 m.

Each lighting system of the plurality of lighting systems can be configured such that the direct non-diffused light of each of the lighting systems partly passes the screen structure, thereby generating a divergent light beam portion. Neighboring lighting systems can be arranged at a distance with respect to each other and/or provided with a divergence such that the divergent light beam portions of the neighboring lighting systems overlap after a propagation length at a distance from the lighting unit that is smaller than 3 m, for example, smaller than 2 m, or smaller than 1 m.

Each lighting system can be configured such that the direct non-diffused light of each of the lighting systems is completely blocked by the screen structure. The screen structures of two neighboring lighting systems can abut to each other.

Further embodiments of the above aspects, are disclosed in the dependent claims, which are incorporated herein by reference. For example, in some embodiments, an extension of the screen structure in an azimuthal direction around the main light beam direction of the divergent light beam portion, as it enters the light passage, and/or the spatial orientation of the screen structure with respect to the divergent light beam portion may be selected such that the illuminated screen section extends partly, for example at the most over 220°, 200° or 190° or in some embodiments only several 10°, in azimuthal direction around the main light beam direction when the divergent light beam portion enters the light passage.

In some embodiments, the lighting systems may be integrated in a wall or ceiling of a room and illuminate the room through a lightwell.

Other features and aspects of this disclosure will be apparent from the following description and the accompanying drawings.

BRIEF DESCRIPTION OF THE DRAWINGS

FIG. 4 is a schematic view illustrating the geometry of the light well of FIG. 3;

FIG. 5 is a schematic cross-section in a first direction along the short side of the exemplary lightwell of FIG. 3;

FIG. 6 is a schematic cross-section in a first direction along the long side of the exemplary lightwell of FIG. 3;

FIG. 7 is a further exemplary schematic cross-section of a round exemplary lightwell;

FIG. 8 is a schematic view illustrating the geometry of the light well of FIG. 7;

FIG. 9 is a schematic perspective view illustrating an exemplary illuminated screen of a lighting system;

DETAILED DESCRIPTION

Figure 1:
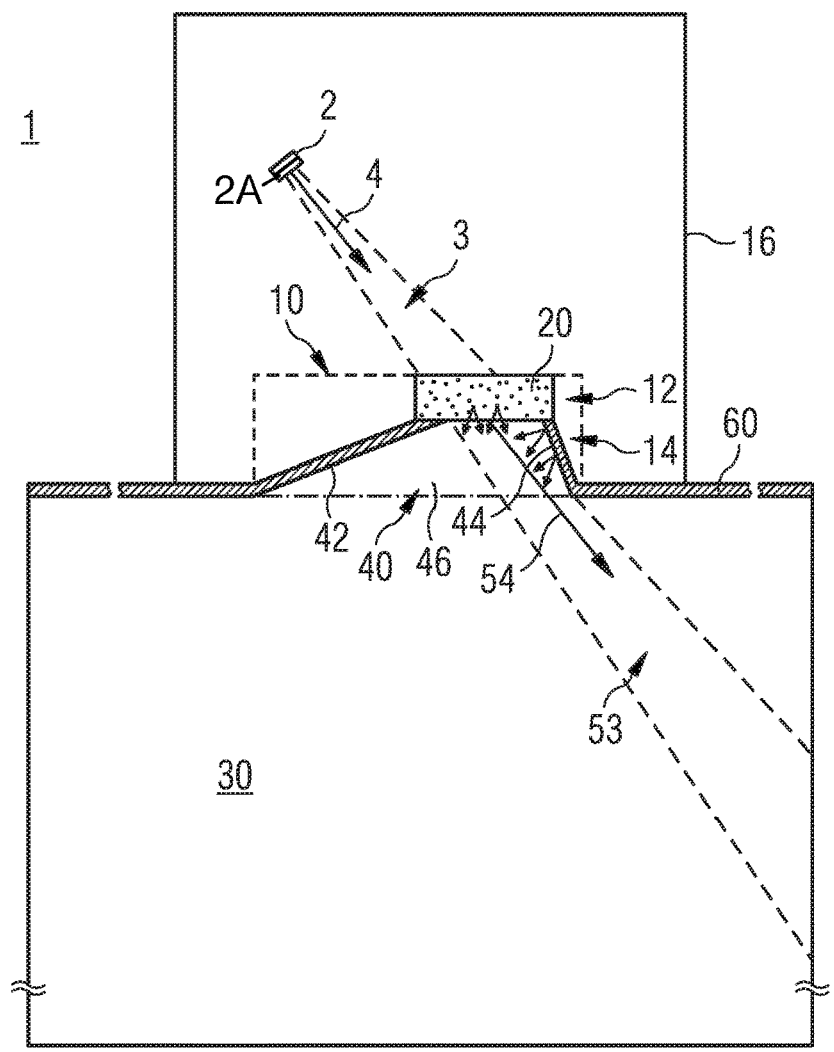
FIG. 1 is a schematic cross-section of an exemplarily lighting system illuminating a room.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that lighting systems based on sunlight imitation and Rayleigh diffusers provide on the one side diffused light of the Rayleigh diffusers and on the other side strongly directed light (herein also referred to as direct light) passing the Rayleigh diffusers. Accordingly, when installed in a ceiling, the illumination is only to some extent provided at the ceiling via the Rayleigh diffusers, and at the floor by the spot created there by the direct light. It was realized that one may increase top down illumination by providing additionally a lit up screen as a scattering surface within the path of the direct light downstream of the Rayleigh diffuser, thereby creating a further diffuser that increases the light illumination from the top (herein also referred to as lit up screens).

Moreover, it was realized that the impression of successful sunlight imitation can be improved for direct light sources with an in principle viewable divergence when the additionally provided lit up screen provides for light shadow transition(s) that emphasize the impression of a specific light propagation direction although the directed light itself has some divergence.

With respect to the light shadow transition supporting the sunlight impression, the shadow is the shadow with respect to the direct light. In addition, there may be shadow transitions with respect to the diffused light. However, those shadows do not provide for a sunlight incidence direction and, thus, do not contribute in the geometrical aspect of lines to the sunlight impression.

The impression of a specific light propagation direction may be achieved by illuminating only a limited azimuthal angular range around the propagation direction of the light beam leaving the Rayleigh diffuser. For sunlight, i.e. essentially non-diverging light, the half azimuthal angular range for an oblique incidence angle would be lit. In artificial systems, one may still provide for a sunlight impression based on an azimuthal angular range that may be increased to about, for example, 220°, or 200°, or 190°.

It is noted that a deviation of the ideal sunlight azimuthal angular range within a limited range may be acceptable to provide for sunlight imitation.

However, structural configurations may allow selecting specific azimuthal angular ranges. For example, considering a rectangular aperture/panel and a parallelepiped lightwell (i.e. with walls perpendicular to the panel), an inclined sun beam will lit at most two of the four walls (and thus provide for 180° illumination in azimuthal direction). In contrast, a diverging light beam that is inclined in one plane of the rectangular and, thus, shines light from one side (not from a corner)—in other terms having the main light beam direction inclined with respect to two walls but propagating within the plane of the other two walls of the parallelepiped lightwell—will illuminate three walls instead of two, thus making the impression of the illumination less natural. It is noted that when moving the main light beam direction out of the plane of the other two walls, at some angle that depends on the divergence, the diverging beam—thus coming from a corner will illuminate only two walls. Based on the above realization, handling a divergent light beam incident from a side may include tilting at least one of the two walls at the side such that at most two walls are lit in spite of the divergence. Respective embodiments are disclosed herein. Specifically, the wall to be tilted is that one corresponding to one of the two walls being at the side, e.g. extending along or even being essentially parallel to the main light beam direction. This may limit the illumination of the side walls to the one facing the main light beam direction and one neighboring wall. In addition, tilting the walls at the side from which the light beam is incident away from the main light beam direction (herein also referred to as tiling back) may result in one or two light shadow transitions bordering the lit up sections of the side walls.

Due to the divergence, the screen structure may be adapted to the angle of incidence. For example, for a rectangular Rayleigh diffuser, two neighboring sides of a four sided screen may be tilted to the back such that transmitted directed light will not hit those sides but only will hit the remaining two sides of the four sided screen, for example, partly. In some embodiments, as stated above, in the simplest case only one side needs to be tilted.

To further improve sunlight imitation, one or both of the remaining two sides may be slightly folded back, thereby providing still the additional scattering surfaces but additionally providing shadow lines that, for example, seem at least from some positions within an illuminated room to be essentially parallel and, thus, creating the impression of sunlight. If the lighting system is for example, installed close to a wall or corner of a room, essentially the main part of the room will provide for that impression. In some embodiments, the herein disclosed lighting systems will be installed in a room such that the lit up sections of the lamp are at a distance to the room in the range from 0 meters (m) up to 2 m, for example up to 1 m.

For example, a lamp shade-like structure is proposed with a screen structure that is at least partly illuminated. In some embodiments, a lamp shade-like structure provides at least one transition between an illuminated screen section and a non-illuminated screen section.

Further aspects are based on the realization that tilting the orientation of the Rayleigh diffuser with respect to the floor, wall, or in general a (for example planar) front plane of the lighting system allows a more compact configuration while maintaining desired incident angles of the direct light onto the Rayleigh diffusers. Thus, less space is required for the lighting systems.

Further aspects are based on the realization that by installing a plurality of lighting systems, one may generate a further impression of the directionality of the illumination. Specifically, multiple assumed to be parallel contrast lines of lighting systems can be provided by arranging the lighting systems in a fixed geometrical orientation with respect to each other.

For the technology disclosed herein it is further referred to PCT/EP2012/072648, entitled "Artificial illumination device," filed on 14 Nov. 2012 and PCT/IB2013/060141, entitled "Artificial lighting system for simulating a natural lighting" by the same applicant, the contents of both of these applications are herein incorporated in their entirety for illustration purposes of lighting systems using Rayleigh diffusers. Although the Rayleigh diffusers of the herein disclosed embodiments are exemplarily shown in the drawings to be planar panel-shaped, thereby imitating a window appearance. However, although non-panel-like configurations may be used such as curved structures.

Herein, the term panel is used in general for the Rayleigh diffuser while the term screen is used for the illuminated screen which diffuses the directed non-diffused light having passed the Rayleigh diffuser.

In general, the Rayleigh diffuser may be configured as a passive diffuser or a side lit diffuser, e.g. a panel illuminated by, for example blue, LEDs from the side. Accordingly, the Rayleigh diffuser may in some embodiments be a secondary light source which emits diffused light and is nevertheless partially transparent to the light of the (main) light source.

As disclosed herein the screen as well as the Rayleigh diffuser are substantially not absorbing and both may be understood to act as secondary sources of luminous radiation.

Referring to FIG. 1, a lighting system 1 is illustrated schematically in a cut view of a room 30.

In detail, lighting system 1 comprises a first light source 2, configured to emit light in an emission solid angle to form a light beam 3 propagating along a main light beam direction 4. Moreover, first light source 2 emits light in the visible region of the light spectrum, for example, with wavelengths between 400 nm and 700 nm. Moreover, first light source 2 emits light (visible electromagnetic radiation) with a spectral width preferably larger than 100 nm, more preferably higher than 170 nm. The spectral width may be defined as the standard deviation of the first light source's wavelength spectrum.

Lighting system 1 also includes a lamp shade-like structure 10 that comprises a bottom unit 12 and a screen structure 14. As shown in FIG. 1, first light source 2 and lamp shade-like structure 10 are provided within a dark box 16 thereby avoiding light originating not from first light source 2 to enter bottom unit 12 from within box 16. Bottom unit 12 is referred to as bottom unit in view of it being at the bottom of the lamp-shade like structure when look at from the room. However, it is noted that lamp system may be provided in ceilings or walls, and, accordingly, bottom unit 12 is would not be at the bottom of the room or vertically at a lower end of lamp shade-like structure.

Dark box 16 comprises a light tight housing structure having, for example, a cover, side walls, and a bottom. Parts of the bottom of the light tight housing structure may be formed by bottom unit 12 and screen structure 14. When installing the lighting system at a ceiling or side wall of a room, the bottom of the dark box would be part of the ceiling or side wall of the room, respectively.

Bottom unit 12 comprises a diffused light generator 20. Diffused light generator 20 is, for example, shaped as a panel such as a parallelepiped panel. In particular, the panel is delimited by a first surface and a second surface (see, for example also FIG. 10 and reference numerals 1012A and 1012B) that are parallel to each other; preferably, diffused light generator 20 is thin with a thickness, measured along a direction perpendicular to the first and the second surfaces, which has a square value not larger than 5%, for example not larger than 1%, of the area of the first or the second surface.

More particularly, diffused light generator 20 operates as a Rayleigh diffuser, which substantially does not absorb light in the visible range and which diffuses more efficiently the short-wavelength in respect to the long-wavelength components of the impinging light, e.g. a panel which substantially does not absorb light in the visible range and which diffuses light in the wavelength range 450 nm (blue) at least 1.2 times, for example at least 1.4 times, such as at least 1.6 times more efficiently than light in the wavelength range around 650 nm (red), wherein a diffusion efficiency is given by the ratio between the diffused light radiant power with respect the impinging light radiant power. Optical properties and microscopic characteristic of Rayleigh like diffusers are also described in detail in the patent application EP 2 304 478 A1 mentioned above. A further insight on the microscopic features is also provided in what follows.

In the embodiment of FIG. 1, first light source 2 is vertically and horizontally displaced with respect to the center of diffused light generator 20 (in some embodiments of thin diffused light generator essentially identical to reference numeral X provided in some figures), and illuminates the top surface of diffused light generator 20 in its entirety under an angle of about 60° (referring to the main light beam direction).

In some embodiments, first light source 2 may be arranged vertically above, for example, the center of diffused light generator 20, when, for example, diffused light generator 20 is tilted with respect to the plane of a room wall or ceiling. However, as will be understood by the skilled person, in particular with respect to some of the herein disclosed aspects, a main light beam direction 4 of light beam 3 under an angle of 90° with respect to a wall or ceiling will require more complex screen structures. Accordingly, for simplicity the herein disclosed embodiments will be based on a tilted angle of the main light beam direction 4 with respect to the ceiling or wall in which the lighting system is integrated.

Via screen structure 14, lighting system 1 is optically coupled to a region to be illuminated such as room 30 in a building. Room 30 may, for example, be shaped as a parallelepiped and delimited by lateral walls, a floor, and a ceiling 60. In particular, without losing generality, it is assumed that screen structure 14 is configured as a lightwell 40, which provides light to room 30.

With that understanding, bottom unit 12 is at the bottom of lightwell 40 and screen structure 14 provides side walls 42, 44 of lightwell 40. Bottom unit 12 and screen structure 14 define a light passage 46. In any case, the herein disclosed aspects are not restricted to the shape and/or arrangement of lightwell 40; as an example, according to further embodiments (see for example FIGS. 7 to 9), lightwell 40 may be formed in a round shape or may comprise only one or more isolated screens that are, for example, planar, round, and/or tilted.

Again referring to diffused light generator 20, and assuming that light beam 3 is diverging enough to illuminate the complete or at least a large portion of diffused light generator 20, diffused light generator 20 will separate light beam 3 in four components, particularly in:

a transmitted (directed non-diffuse) component, formed by light rays that pass through diffused light generator 20 and do not experience significant deviations, e.g. is formed by light rays experiencing a deviation smaller than 0.1°; a luminous flux of the transmitted component is a significant fraction of the overall luminous flux incident on diffused light generator 20;

a forward diffuse component, formed by scattered light exiting diffused light generator 20 into light passage 46 (with the exception of that light beam direction and of directions differing from that light beam direction by an angle smaller than 0.1°); a luminous flux of the forward diffuse component corresponds to a blue skylight fraction generated from the overall luminous flux incident on diffused light generator 20;

a backward diffuse component, formed by scattered light exiting diffused light generator 20 into box 16; a luminous flux of the backward diffuse component is, in general, in the range of but preferably less than the blue skylight fraction; and a reflected component, formed by reflected light and propagating along a direction at a mirror angle into box 16, a luminous flux of the reflected component depends, for example, on the incident angle of the light beam onto diffused light generator 20.

That having being stated, the optical properties of diffused light generator 20 are such that the blue skylight fraction is within the range from 5% to 50%, such within the range from 7% to 40%, or even in the range from 10% to 30%, or within the range from 15% to 20%;

the average CCT of the forward diffuse component is significantly higher than the average correlated color temperature CCT of the transmitted component, for example it may be higher by a factor of 1.2, or 1.3, or 1.5 or more;

diffused light generator 20 does not absorb significantly incident light, namely the sum of the four components is at least equal to 80%, or 90%, or even 95%, or 97% or more;

diffused light generator 20 scatters mostly forward, namely more than 1.1, or 1.3, or eve 1.5, or 2 two times more than is back scattered; and diffused light generator 20 may have low reflection, namely less than a portion of 9%, or 6%, or even less than 3%, or 2% of the impinging light is reflected.

In some embodiments, diffused light generator 20 comprises a solid matrix of a first material (e.g., a resin having excellent optical transparency, such as thermoplastic resins, thermosetting resins, photocurable resins, acrylic resins, epoxy resins, polyester resins, polystyrene resins, polyolefin resins, polyamide resins, polyimide resins, polyvinyl alcohol resins, butyral resins, fluorine-based resins, vinyl acetate resins, or plastics such as polycarbonate, liquid crystal polymers, polyphenylene ether, polysulfone, polyether sulfone, polyarylate, amorphous polyolefin, or mixtures or copolymers thereof), wherein nanoparticles of a second material (e.g., an inorganic oxide such as ZnO, TiO2, ZrO2, SiO2, Al2O3) are dispersed, this second material having a refractive index different from the first material's refractive index. In the drawings, nanoparticles are schematically indicated by dots within diffused light generator 20. In some embodiments, both the first and the second material basically do not absorb electromagnetic radiation in the visible wavelength range.

Moreover, diffused light generator 20 may be uniform, in the sense that, given any point of diffused light generator 20, the physical characteristics of diffused light generator 20 in that point does not depend on the position of that point. Furthermore, diffused light generator 20 may be monolithic, namely the solid matrix does not feature any discontinuity due to gluing or mechanical coupling. Such characteristics of diffused light generator 20 is not, however, necessary, although they may render diffused light generator 20 easier to be manufactured.

In some embodiments, the nanoparticles may be monodisperse. The nanoparticles may be spherically shaped or shaped otherwise. The effective diameter D of the nanoparticles (for a definition in the case of non-spherical shape, see below) falls within the range [5 nm-350 nm], such as [10 nm-250 nm], or even [40 nm-180 nm], or [60 nm-150 nm], where the effective diameter D is given by the diameter of the nanoparticles times the first material's refractive index.

Moreover, nanoparticles are distributed inside diffused light generator 20 in a manner such that their areal density, namely the number N of nanoparticles per square meter, i.e. the number of nanoparticles within a volume element delimited by a portion of the surface of diffused light generator 20 having an area of 1 m2, satisfies the condition N≥Nmin, where:

$$N_{min} = v \frac{10^{-29}}{D^6} \cdot \left| \frac{m^2 + 2}{m^2 - 1} \right|^2$$

wherein v is a dimensional constant equal to 1 meter6, Nmin is expressed as a number/meter2, the effective diameter D is expressed in meters and wherein m is equal to the ratio of the second material's refractive index to the first material's refractive index.

In some embodiments, the nanoparticles are distributed homogenously, at least as far as the areal density is concerned, i.e. the areal density is substantially uniform on diffused light generator 20, but the nanoparticle distribution may vary across diffused light generator 20. The areal density varies, for example, by less than 5% of the mean areal density. The aerial density is here intended as a quantity defined over areas larger 0.25 mm2.

In some embodiments, the areal density varies, so as to compensate illumination differences over diffused light generator 20, as lit by light source 2. For example, the areal density N(x,y) at point (x,y) may be related to the illuminance I(x,y) produced by light source 2 at point (x,y) via the equation N(x,y)=Nav*Iav/I(x,y)±5%, where Nav and Iav are the averaged illuminance and areal density, these latter quantities being averaged over the surface of diffused light generator 20. In this case the luminance of diffused light generator 20 may be equalized, in spite of the non-uniformity of the illuminance profile of light source 2 on diffused light generator 20. To this regard, it is reminded that the luminance is the luminous flux of a beam emanating from a surface (or falling on a surface) in a given direction, per unit of projected area of the surface as viewed from the given direction, and per unit of solid angle, as reported, as an example, in the standard ASTM (American Society for Testing and Materials) E284-09a.

In the limit of small D and small volume fractions (i.e. thick panels) an areal density N≈Nmin is expected to produce scattering efficiency of about 5%. As the number of nanoparticles per unit area gets higher, the scattering efficiency is expected to grow proportionally to N, until multiple scattering or interferences (in case of high volume fraction) occur, which might compromise color quality. The choice of the number of nanoparticles is thus biased by the search for a compromise between scattering efficiency and desired color, as described in detail in EP 2 304 478 A1. Furthermore, as the size of nanoparticles gets larger, the ratio of the forward to backward luminous flux grows, such ratio being equal to one in the Rayleigh limit. Moreover, as the ratio grows, the aperture of the forward scattering cone gets smaller. Therefore, the choice of the ratio is biased by the search for a compromise between having light scattered at large angles and minimizing the flux of backward scattered light. However, in a per se known manner, an antireflection layer (not shown) may be deposited on diffused light generator 20, with the aim of minimizing reflection; by doing so, the luminous efficiency of lighting system 1 is raised and the visibility of diffused light generator 20 (as a physical element) from an observer in room 30 is reduced.

In some embodiments, nanoparticles may not have a spherical shape; in such case, the effective diameter D can be defined as the effective diameter of the equivalent spherical particles, namely the effective diameter of spherical particles having the same volume as the aforementioned nanoparticles.

Furthermore, in some embodiments, the nanoparticles are polydispersed, i.e. their effective diameters are characterized by a distribution N(D). Such distribution describes the number of nanoparticles per surface unit and unit interval of effective diameter in a neighborhood of the effective diameter D (that is, the number of particles per surface unit having an effective diameter between D1 and D2 is equal to $$N_{D_2-D_1} = \int_{D_1}^{D_2} N(D)dD.$$

These effective diameters may fall in the range [5 nm-350 nm], i.e. the distribution may be non-null within this range. In this case, considering that scattering efficiency grows approximately, i.e. in the limit of small particles, with the sixth power of the nanoparticle's diameter, the polydisperse distribution behaves approximately as a monodisperse distribution with a representative diameter D'eff defined as:

$$D'_{eff} = \left\{ \frac{\int N(D)D^6 dD}{N} \right\}^{1/6}$$

where $$N = \int N(D)dD$$

D'eff may by selected so as to lie within the range [5 nm-350 nm], preferably [10 nm-250 nm], more preferably [40 nm-180 nm], still more preferably [60 nm-150 nm].

Moreover, diffused light generator 20 may be at a distance from light source 2 that may not be sufficient for providing a sun-like impression when light source 2 would be in sight for an observer inside room 30. However, as illustrated below, in some embodiments, screen structure 14 blocks any view from room 30 onto light source 2. Accordingly, the distance between the expected position of the observer and light source 2 may be less than 5 m, even less than 3 m.

For example, in the case of a ceiling-type application, the distance between diffused light generator 20 and light source 2 may be equal to or less than 2 m such as even 0.2 m, or 0.1 m, or 0.01 m or less, in the case of very compact devices.

In some embodiments, lighting system 1 may include a reflective system (not shown) as illustrated, for example, in the above identified patent applications. In those embodiments, there may be geometric condition on reflected light rays requiring that no light ray generated inside room 30 and can be subsequently reflected by the reflective system in a manner such that it hits again diffused light generator 20. Even alternatively, the reflective system may be arranged such that all inbound light rays emanating from diffused light generator 20 and impinging onto the reflective system, irrespective of the position on diffused light generator 20 from which the inbound light rays emanate, are reflected onto an absorbing inner surface of box 16.

In some embodiments, this geometric condition may be loosened because of the presence of screen structure 14. For example, the geometric condition may be for reflected light rays that no light ray generated inside room 30 may pass screen structure 14 in the downstream direction. Thus, the extent of the inner surface of box 16 to be absorbing may be reduced.

Returning to FIG. 1 and the specific configuration of lamp shade-like structure 10, light beam 3 will exit diffused light generator 20 essentially unchanged with respect to the main light beam direction (potentially slightly displaced due to the thickness of diffused light generator 20). It is noted that main light beam direction 4 may in principal change its orientation in space due to optical elements upstream of diffused light generator 20. For the interaction with diffused light generator 20 and the light screen structure, however, only the orientation directly upstream of the diffused light generator 20 needs to be considered as will be apparent to the skilled person. Moreover, the transmitted light beam—herein referred to as divergent light beam portion 53 because some portions of light beam 3 may be cut off by the limited size of diffused light generator 20—is characterized by its main light beam direction 54 when divergent light beam portion 53 exits diffused light generator 20 and propagates within light passage 46.

To provide for additional scattered light that can contribute to a illumination of room 30 from the top (when lighting system 1 is installed in a ceiling as shown in FIG. 1), side wall 44 reaches into divergent light beam portion 53, thereby causing scattering of the directed non-diffused light on the inner screen face of side wall 44 as explained later-on in connection with the following figures. The extent to which side wall 44 cuts off divergent light beam portion 53 defines the amount of (white) scattered light acting as a secondary diffuse light source. In some embodiments, divergent light beam portion 53 is completely blocked by the side wall(s) of lightwell 40 such that no directed non-diffused light reaches the inside of room 30. In addition, also scattered light of diffused light generator 20 may impinge on side wall 44 and be scattered again.

As already indicated in FIG. 1, side wall 42 and side wall 44 extend under quite different angles with respect to ceiling 60. This difference takes into account that lighting system 1 is based on a divergent light beam as schematically illustrated in FIG. 2.

The difference takes further into account that one would like to extend the visibility of the sky-blue scattering from diffused light generator 20. While side wall 44 is bent towards main light beam direction 4 (to be lit directly by light beam 3), side wall 42 may be tilted away from main light beam direction 4 as much as one likes. Notably, larger tilt will enable an observer to see the sky imitating diffused light generator 20 from larger angles with respect to main light beam direction 4. This increases the distance from the lightwell, at which one can see the same, in case the lightwell is positioned in a room at a given height from the floor.

Figure 2:
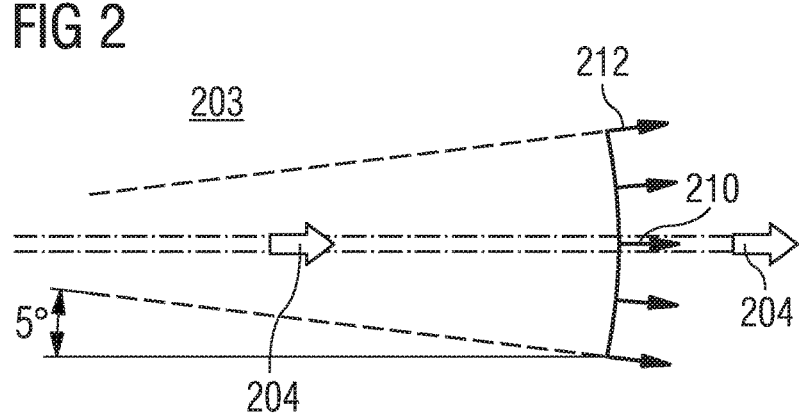
FIG. 2 is a schematic illustration of a light beam having a non-uniform direction of propagation across the beam.

In FIG. 2, divergent light beam 203 is characterized by a main light beam direction 204. However, the local propagation direction across divergent light beam 203, i.e. a propagation direction of the directed non-diffused light, is modified in dependence of the position within the cross-section of divergent light beam 203. Specifically, a central propagation direction 210 is essentially parallel to main light beam direction 204 in an inner area of divergent light beam 203. However, a propagation direction 212 is increasingly inclined with respect to main light beam direction 204 with increasing distance from the inner area. Exemplarily, an angle of 5° is indicated in FIG. 2 for the light beam being the furthest out. In some cases, the divergence may differ for different beam cross sections. For example, in orthogonal beam cross-sections the divergence may be 10° and 30°, respectively, or generally in the range of, for example, 5° to 15° such as 10° or 20° to 40° such as 30°. Accordingly, such a divergent light beam 203 would, when entering a hollow cylinder in axial direction, illuminate the complete azimuthal range of the cylinder's inner wall. In contrast, an ideal non-diverging light beam would pass through the cylinder without illuminating the inner wall.

Similarly, the ideal non-divergent light beam would only illuminate the opposing half when entering the hollow cylinder under an angle, i.e. at a maximum, a range of 180° in azimuthal direction around the propagation direction would be illuminated. In contrast, divergent light beam 203 would be able to illuminate more than 180° in azimuthal direction around its main light beam direction 204. In connection with imitating sunlight irradiation, the observer would notice such a situation as paradox and not get the desired impression of the light source being at infinity.

To avoid the paradox impression, only within a selected azimuthal range around main light beam direction 54, lamp shade-like structure 10 will comprise a screen structure being directed towards divergent light beam portion 53 and outside of that range, the screen structure will not be present or will face away from divergent light beam portion 53, for example, by extending essentially orthogonally or even backwards with respect to main light beam direction 54, thereby avoiding any encounter of divergent light beam portion 53 in those azimuthal sections.

In other words, in some embodiments, screen structure 14 is configured as a funnel-like structure that diverges in a downstream direction more than the divergent light beam portion. Thereby, it may become possible to limit illumination of the screen structure such that opposite sides are maintained in shade and lit up, respectively, thereby imitating sunlight illumination and compensating for the divergence of the beam.

An exemplary structure of a lightwell 340 as an embodiment of a lamp shade-like structure is disclosed in the following in connection with FIGS. 3 to 6.

Lightwell 340 is integrated in a ceiling 360 and comprises two side walls 342 and 343 extending under a small angle with respect to ceiling 360 and two side walls 344, 345 extending under an angle in the range around 90° with respect to ceiling 360. For example, side walls 344, 345 extend under an angle in the range from 60° to 130° or more for a divergence of the beam in the respective direction of, for example, 5° to 15° such as 10° or 20° to 40° such as 30° as respectively shown in FIGS. 5 and 6.

An aperture 380 is formed by four corners formed by side walls 342, 343, 344, 345 and ceiling 360. Aperture 380 may be rectangular with side lengths in the range of, for example, 1.4 m to 1.6 m such as 1.5 m and 2 m to 2.5 m such as 2.2 m, respectively for the width and length. Side walls 342, 343, 344, 345 form an asymmetric funnel connecting aperture 380 with an illuminated bottom face 313 provided by diffused light generator 312. Bottom face 313 is delimited—when look from below—by four corners 382, which are formed by side walls 342, 343, 344, 345 and diffused light generator 312. Bottom face 313 may also be rectangular with side lengths in the range of, for example, 0.8 m to 1.1 m such as 0.9 m and 1.5 m to 2 m such as 1.8 m, respectively for the width and length. Ceiling 360 or a part thereof may be an example of a front cover of the in the ceiling integrated lighting system.

In the perspective view of FIG. 3, an observer looks at lightwell 340 from below under an angle of about 40° with respect to ceiling 360 in direction onto a corner 370 formed by side walls 344, 345. Under a similar (horizontal) direction component but from above, a light beam falls onto diffused light generator 312, the main light beam direction being indicated by an arrow 304 in FIGS. 3 to 6.

In the embodiment of FIGS. 3 to 6, respective neighboring corners forming aperture 380 and illuminated bottom face 313 form orthogonal edges such that both are rectangular. Side faces of side walls 342, 343, 344, 345 extend planar between respective corners.

However, aperture 380 and illuminated bottom face 313 may be of any other geometrical shapes which could result in planar or non-planar side faces extending there between.

Figure 3:
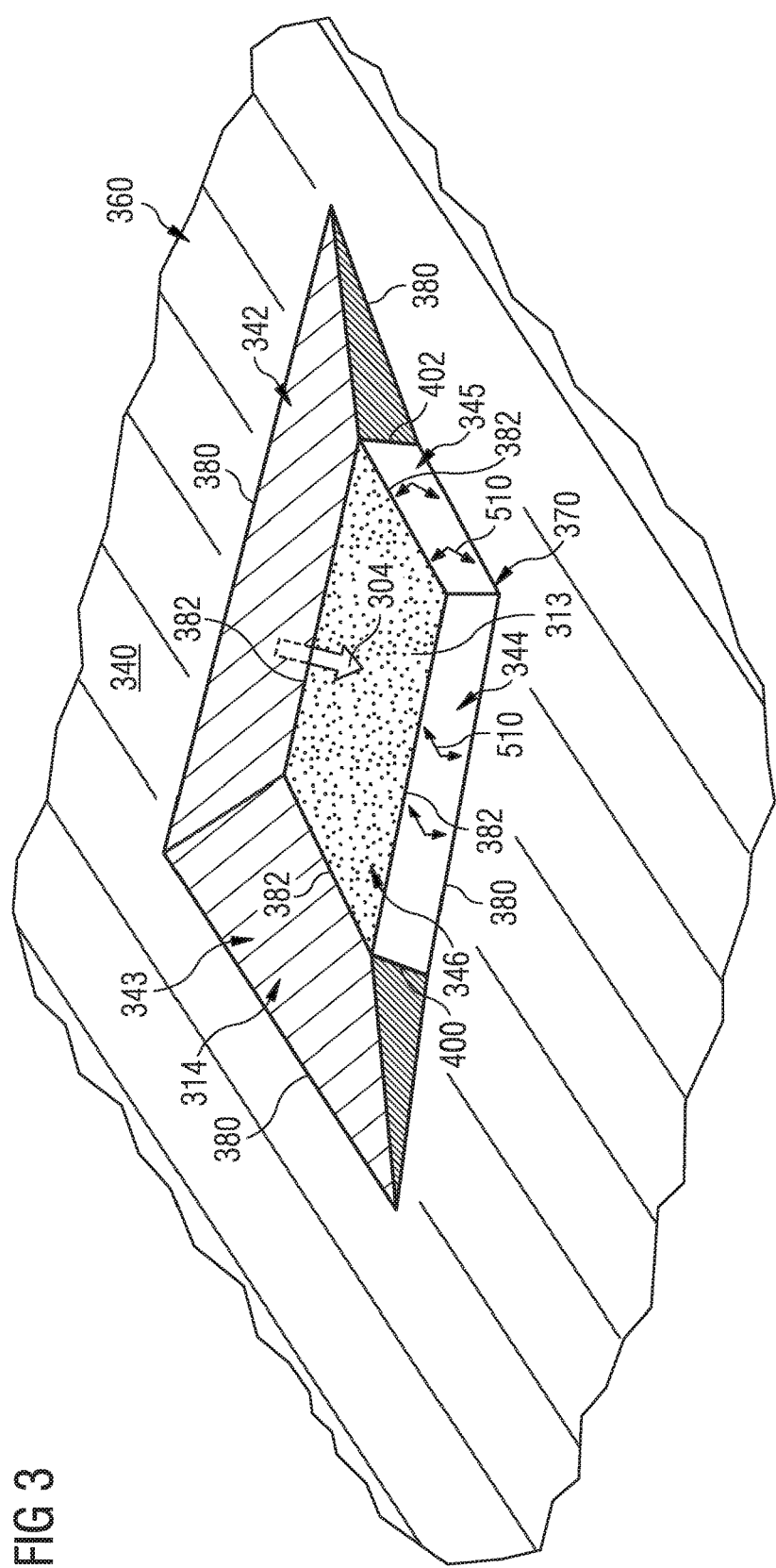
FIG. 3 is a schematic perspective view of an exemplary lightwell in a ceiling.

As illustrated in FIG. 3 by shading, side faces of side walls 342 and 343 are not illuminated and thus form non-illuminated screen sections 392 and 393, respectively referenced in FIG. 4. In contrast, side walls 344 and 345 are (at least) partly illuminated and thus form illuminated screen sections 394 and 395 as well as non-illuminated screen sections 396 and 397.

As shown in FIGS. 3 to 6, a center of the light beam impinges on a center X of illuminated bottom face 313. At least a divergent light beam portion 353 passes diffused light generator 312 and exits illuminated bottom face 313 along a main light beam direction 354. With respect to that main light beam direction 354, illuminated screen sections 394 and 395 provide for a brightly lit up secondary scattered light source that initially—right next to illuminated bottom face 313—extends azimuthally over 180° and then, due to the divergence or tilt angle of the screen sections, decreases or increases in azimuthal extension (see, for example, the presence of non-illuminated screen sections 396 and 397). To limit that extension on side walls 344 and 345, side walls 342 and 343 may be tilted back with respect to main light beam direction 354.

At the transition between illuminated screen sections 394 and 395 and non-illuminated screen sections 396 and 397, respectively, shadow borders (herein also referred to as contrast lines or shadow/light transition lines) are indicated in FIGS. 3 and 4 with reference numerals 400 and 402. In general the tilted configurations of the side walls may result in the fact that a side extends from a region being directly illuminated to a region not being lit up, thereby creating a contrast line. Other side walls may not be lit up by direct illumination.

In addition to the difference in luminance, the directly lit up sections may be perceived to be different in color from those sections of the walls only illuminated by the diffused light. For example, directly lit up sections may be perceived as being warm (illumination with a complete sun-like spectrum) and those sections of the walls only illuminated by the diffused light may be perceived as being cold (illumination only be blue light of diffused light generator 312), Due to the divergence of transmitted divergent light beam portion 353 and the tilt angle of side walls 344 and 345, the direction of the shadow borders may be oriented such that, when seen from a selected position within the room, appear to be parallel (as indicated schematically in FIG. 3). Thereby, also for a divergent light beam, the controlled orientation of the screen structure, specifically the side walls, may enforce the impression of sunlight and the respectively expected directionality of shadow borders and the extension of light up faces.

Finally, in FIGS. 3 to 6 the various components of light provided for illumination by lighting system 1 are indicated:

scattered light 500 of diffused light generator 312 having, for example, a higher CCT then the impinging light beam;

scattered light 510 generated by divergent light beam portion 353 and originating from illuminated screen sections 394 and 395 of side walls 344 and 345 of lightwell 340; and directed non-diffused light within divergent light beam portion 353.

The amount of scattered light 500 of diffused light generator 312 and directed non-diffused light within divergent light beam portion 353 may be controlled by the depth of lightwell 340 as well as the spatial orientation of illuminated screen sections 394 and 395 and their surface characteristics. At least the illuminated screen sections 394 and 395 may be of a material or coated material that has a diffused reflectance with a large reflectivity of, for example, above 70% or 80% or even above 90%. Accordingly, illuminated screen sections 394 and 395 will diffuse impinging light in a backward direction and essentially be non-absorbing.

In some embodiments, the side wall(s) may be coated with a surface featured by non-isotropic diffuse reflectance, and particularly having diffuse reflectance different from that of an ideal Lambertian diffuser, e.g. a diffuse reflectance peaked around the direction of specular reflection. Some embodiments of the surface may show a peak of a full width half maximum angle not larger than 120°, for example 90°, most preferably 60°. This circumstance may prevent that a relevant portion of the light scattered by screen structure 14 returns through diffused light generator 20 in the backward direction and is absorbed by the walls of dark box 16. Thus, specific surface features may allow an increase (or avoid a reduction) in the light flux generated by light source 2. Moreover, the presence of a side wall diffuse reflectance peaked around the specular reflection direction might ensure that virtually all the direct light component that is scattered by screen structure 14 exits light passage 46 in the downstream direction into room 30.

In some embodiments, such an opaque screen may be partially transmitting if directed non-diffuse light passing through the screen is intended to be present in room 30. In some embodiments, illuminated screen sections 394 and 395 may have a white colored rough surface. A partial transmitting illuminated screen section may, for example, be part of the embodiment shown in FIG. 9.

FIG. 7 shows a cross-section that is in principal similar to the cross-section of FIG. 5. For example, a light beam 703 falls—under an angle of about 25° onto a diffused light generator 712 comprising a Rayleigh panel. However, as can be seen from FIG. 8, diffused light generator 712 forms a circular bottom face 713 of a lightwell 740. The depth of lightwell 740 is selected such that a complete divergent light beam portion 753 having passed diffused light generator 712 is scattered on a curved side wall section 744 and forms therein an illuminated screen section 794 being completely surrounded by a non-illuminated screen sections 793 except for the neighboring section of circular bottom face 713. Illuminated screen section 794 is a brightly lit up secondary scattered light source that initially—right next to illuminated bottom face 713—extends azimuthally over 180° and then, due to the divergence increases in azimuthal extension. To limit that extension on side wall 744, side wall 744 is increasingly tilted backward with respect to main light beam direction 354 until, for example, an angle of 100° as illustrated in FIG. 7 by wall section 742.

Thereby, also for divergent light beam 754, the controlled orientation of the screen structure, specifically side wall 744, may enforce the impression of sunlight and the respectively expected directionality of shadow/light transition 800, specifically essentially vertical section 802 and 804, and the extension of light up faces.

FIG. 8 illustrates further the effect of the tilt angle and its effect on natural light imitation. In FIG. 8, sections 802 and 804 (dotted lines) point toward left side in the downstream direction, thus leading to an increase in the azimuthal illumination from the 180°, featuring the entrance lit semicircle. This configuration is not exactly natural, since due to the fact that the illuminate light wall is on the right, one expects the sun to coming from left. This should cause sections 802 and 804 of shadow/light transition 800 to be pointing toward the right in the downstream direction as indicated by lines 803 and 805, respectively (and thus pointing in the expected direction of the sun rays). Increasing the tilt angle with respect to the vertical, assuming the lightwell is installed in a ceiling, will move the sections from the position of sections 802/804 to the position of sections 803/805.

In other words, assuming again the lightwell being installed in a ceiling, if the side walls in the region around the vertical shadow/light transition 800 is featured by a divergence larger than the direct light beam divergence, said sections point toward the right as indicated by lines 803 and 805 and thus are consistent to what one will naturally expect. In this case, the azimuthal angle of illuminated screen will decrease, and not increase, towards the floor.

In contrast to the embodiment shown in FIGS. 3 to 6, the lighting system illustrated in FIGS. 7 and 8 does not provide directed non-diffused light within the room and, thus, only comprises components of scattered light 500 of diffused light generator 712 and scattered light 510 generated by divergent light beam portion 753 originating from illuminated screen sections 794 of side wall 744.

Referring to FIG. 9, a further lighting system 900 is shown that, in particular, may be applicable for halls having a large ceiling height such that a divergent light beam portion 953 exiting diffused light generator 912 will spread out over the room and overlap, for example, with divergent light beams of neighboring lighting systems being essentially identical to lighting system 900.

An exemplary illustration will be discussed in connection with FIG. 12.

In general, creating a plurality of "parallel" light-shadow lines by means of a single or a plurality of source-screen pairs (lightwell configurations) is per se not related to the issue related to the fact that different beams may overlap into the room.

The first issue is meant for creating the impression of a distant light source by taking one (or two) line(s) from each source and addressing the parallelism among all those lines.

The second issue, in addition, may require a complete blockage of the direct light for preventing an observer from seeing many sources from a given position.

Returning to FIG. 9, to provide for a perspective impression, a lamp shade-like structure is reduced to a single screen structure 914 being attached to a ceiling 960, for example, via mounts 961. Light of only a section of divergent light beam portion 953 impinges on screen structure 914, thereby creating an illuminated screen sections 994 and a non-illuminated screen section 996.

Due to the limited size of screen structure 914, only a single contrast line 902 is formed on screen structure 914. Thus, again in an arrangement of a plurality of lighting systems 900, a perspective effect based on a set of parallel contrast lines 902 may be created. As previously mentioned, at least illuminated screen section 994 is configured as a material with a diffused reflectance and may be completely opaque or transmit some percentage of directed non-diffused light.

While the foregoing discussion focused on embodiments implementing sunlight imitation based on divergent direct light beams, the following embodiments may in principle also be applicable to sunlight imitation based on non-divergent direct light beams. The skilled person will understand that those structural features, which were disclosed for the divergent light beams, may also be applicable to non-divergent light beams, although not any related effect may be necessary for providing the sunlight impression.

As will be apparent to the skilled person, the following embodiments are directed to providing more compact set-ups that may allow installing the lighting system with a reduced "height" (assuming the lighting system is installed in a ceiling). Accordingly, the lighting systems may be installed with heights in the range from 0.5 m to 1 m or even 0.1 m or 0.01 m or less, e.g. as long as the eye is made able to spot the presence of the shadow line(s).

Specifically, by tilting the diffused light generator, the incident light beam can be provided under an angle with respect to the ceiling plane that is smaller than for a "horizontal" diffused light generator and still maintains the optical conditions at the diffused light generator, for example, with respect to incidence angle onto the diffused light generator and reflected portion at the diffused light generator. At the same time, the lit up screen can be further tilted with respect to the ceiling thereby opening up the angle of visibility of the diffused light generator. This may further allow increasing the area lit up by the direct light. At the same time, the projection, specifically the projected area, of the lit up area onto the ceiling/horizontal plane is increased (again assuming a ceiling installation of the lighting system). Clearly, the top down illumination may be affected, e.g. increased.

Figure 10:
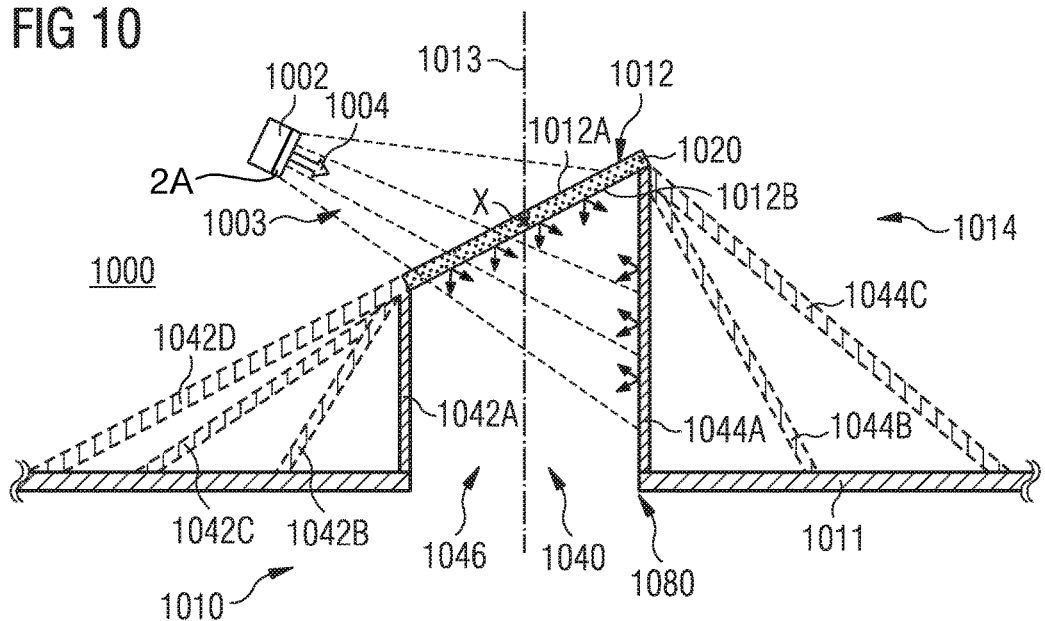
FIG. 10 is a schematic cross-section of further embodiments of a lighting system with a tilted bottom unit.
Figure 11:
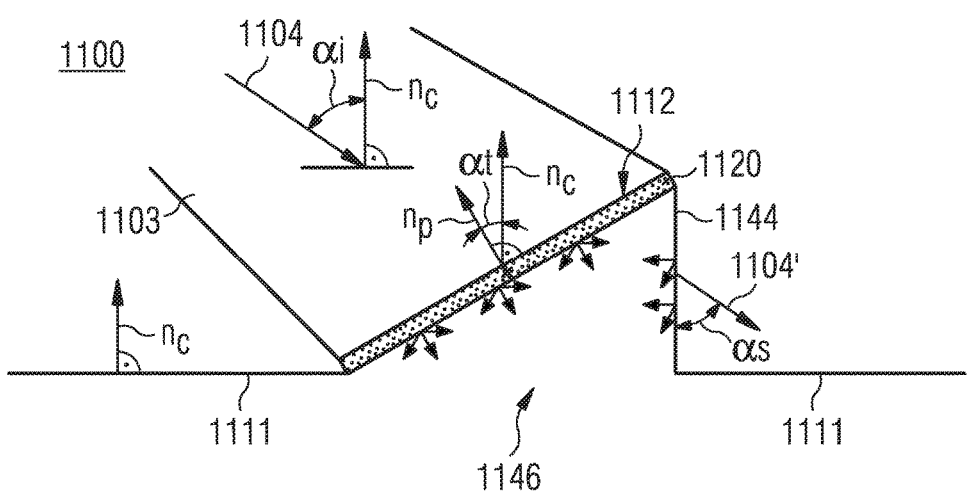
FIG. 11 is a schematic cross-section of a further embodiment of a lighting system illustrating geometrical parameters.

FIGS. 10 and 11 illustrate an exemplary embodiment of a lighting system using a tilted diffused light generator. While FIG. 10 illustrates various structural configurations for the lamp shade-like structure, FIG. 11 illustrates geometrical parameters characterizing those configuration based on a related embodiment of the lamp shade-like structure. The geometrical considerations to the side walls also apply to "non-tilted" Rayleigh diffusers.

Specifically, FIG. 10 discloses a cross-section of a lighting system 1000 along a plane extending through the center X of a diffused light generator 1020. The cross-section extends perpendicular to diffused light generator 1020 (exemplarily assumed to be planar) and extends through a light source 1002.

For the following description and indication of spatial arrangement/orientation, it is assumed that lighting system 1000 is integrated in a ceiling of a room. Specifically, that lighting system 1000 comprises a light source 1002, a lightwell 1040 with a bottom unit 1012 and a screen structure 1014, and a planar front cover 1011.

Planar front cover 1011 is integrated in the ceiling and/or forms part of the ceiling such that a person within the room will see the lower side of planar front cover 1011. Planar front cover 1011 extends in a horizontal plane. In some embodiments, the lighting system may be installed in a wall of the room. Accordingly, the spatial arrangement would be rotated by 90°. A dark box may be provided using planar front cover 1011 and/or screen elements and/or based on separate elements (not shown).

Light source 1002 is configured to emit a, for example, diverging light beam 1003 that falls onto bottom unit 1012 along a main light beam direction 1004. The following concepts may also apply to essentially non diverging light beams Lightwell 1040 defines a light passage 1046 around a vertical direction (indicated by a dashed dotted line 1013) through which light from light source 1002 enters the room.

Bottom unit 1012 has a first surface 1012A being illuminated by direct light beam 1003. Bottom unit 1012 is further characterized by a second surface 1012B that faces into light passage 1046. First and second surfaces 1012A and 1012B are positioned on opposite sides of bottom unit 1012. Bottom unit 1012 further comprises a diffused light generator 1020.

When looking from below lighting system 1000 onto the ceiling, one will be able to see into lightwell 1040 onto bottom unit 1012, specifically onto second surface 1012B. During operation of light source 1002, bottom unit 1012, specifically diffused light generator 1020 emits, for example, diffused sky-like blue light.

In FIG. 10, bottom unit 1012 is tilted with respect to the horizontal plane, indicating that also diffused light generator 1020 is tilted with respect to the horizontal plane. In this configuration, light source 1002 can be positioned closer to ceiling 1011, while maintaining the angle of incidence onto diffused light generator 1020.

FIG. 10 further illustrates that lightwell 1040 is configured as a lamp shade-like structure 1010 and side walls of lightwell 1040 form illuminated and non-illuminated screen sections of screen structure 1014. For screen structure 1014, various angular configurations of the side walls of lightwell 1040 are shown (which in general apply to non-tilted generators 1020).

In a first embodiment (indicated by continuous lines), lightwell 1040 comprises a first side wall 1042A that is not illuminated by the direct light passing through the bottom unit 1012. Lightwell 1040 comprises further an at least partly illuminated side wall 1044A. As schematically indicated in FIG. 10, side wall 1042A and side wall 1044A extend essentially parallel to the vertical direction. Side wall 1044A illuminates the room by scattered light based on the direct light.

In FIG. 10, further geometrical configurations of the side walls are indicated by dashed lines. For example for the non-illuminated side of lightwell 1040, the side wall may be tilted away from the horizontal. For example, a side wall 1042B may be at an angle of about 30° with respect to the vertical, a side wall 1042C may be at an angle of about 60° with respect to the vertical, and a side wall 1042D extends essentially within the plane of bottom unit.

With respect to the illuminated side of lightwell 1040, the side wall may be tilted away from the horizontal in the opposite direction, and thus be tilted away from the light beam passing through bottom unit 1012. For example, a side wall 1044B may be at about 45° with respect to the main light beam direction 1004 and a side wall 1044C may be at about an angle of 15° with respect to the main light beam direction 1004.

Various orientation of those side walls may be combined to form lightwell 1040 and the tilt range may be adapted to the incident angle, the room size, the ceiling height etc.

It is apparent from FIG. 10, that the inclined side walls will increase the visibility of diffused light generator 1020, i.e. the angular range of positions that allow seeing, for example, the (blue) sky imitation. In addition, the tilted illuminated sides provide for larger areas of lit up surfaces such that brighter illumination from top down (assuming ceiling installations) are provided.

In FIG. 11, geometrical parameters are indicated for a further embodiment of a lighting system 1100 in which a planar front cover 1111 (for example a ceiling of a room) borders at one side to a tilted bottom unit 1112 of a lightwell 1140. Accordingly, the cross-section of FIG. 11 does not show a (separate) non-illuminated side wall of a lightwell 1140. An illuminated side wall 1144 is schematically indicated. An incident light beam 1103 is schematically shown by two border lines and a main light beam direction 1104.

In FIG. 11, a normal direction $n_c$ of planar front cover 1111 is shown to extend from planar front cover 1111 in the upward direction (assuming installation of the lighting system in a ceiling). Main light beam direction 1104 extends under an incident angle $\alpha_i$ with respect to normal $n_c$ of ceiling 1111.

Furthermore, a normal $n_P$ is illustrated for a, for example panel-shaped, diffused light generator 1120. Normal $n_P$ is tilted with respect to normal $n_c$ of the ceiling at a (panel) tilt angle $\alpha_t$.

An illuminated screen section of illuminated side wall 1144 extends with respect to main light beam direction 1104 (for illustration purposes also shown as arrow 1104') under a screen angle $\alpha_s$.

Exemplary values for the various angles are as follows in a cross-section along a plane extending orthogonal the diffused light generator (20) and through the light source:

Prior incidence on the diffused light generator 1120, main light beam direction 1104 is inclined with respect to normal direction $n_c$ of planar front cover 1111 by incident angle $\alpha_i$; incident angle may be set in an angular range from 10° to 80° such as 40°, 50°, or 60°; and/or Normal direction $n_p$ of a plane defined by diffused light generator 1120 is inclined with respect to normal direction $n_c$ of the planar front cover 1111 by a tilt angle $\alpha_t$ set smaller than incident angle $\alpha_i$; for example tilt angle $\alpha_i$; may be set in an angular range from 5° to 80°, for example, in the range from 15° to 75° such as 40°, 50°, or 60°; and/or The screen structure comprises a lit-up surface that is inclined with respect to the main light beam direction 1104 at a first screen angle $\alpha_{s1}$ set in an angular range from 0° to 90°, for example at incident angle $\alpha_i$; and/or The screen structure comprises a dark surface that is inclined with respect to the main light beam direction 1104 at a second screen angle $\alpha_{s2}$ being the size of the incident angle $\alpha_i$ or larger; and/or A normal direction of the dark surface is inclined with respect to normal direction $n_c$ of the planar front cover 1111 within the range from the tilt angle $\alpha_i$ to 90°.

As further shown in FIGS. 10 and 11, the light source may be displaced with respect to the bottom unit in a direction parallel to the planar front cover. In addition, the light source may have a distance to the planar front cover comparable to or larger than the distance from the bottom unit to the planar front cover. As previously indicated, the tilted diffused light generator allows an incident angle $\alpha_i$ (with respect to the ceiling) that is larger than for a horizontal diffused light generator. Accordingly, the light source can be position further to the side (in the plane of the ceiling) with respect to the diffused light generator.

Figure 12:
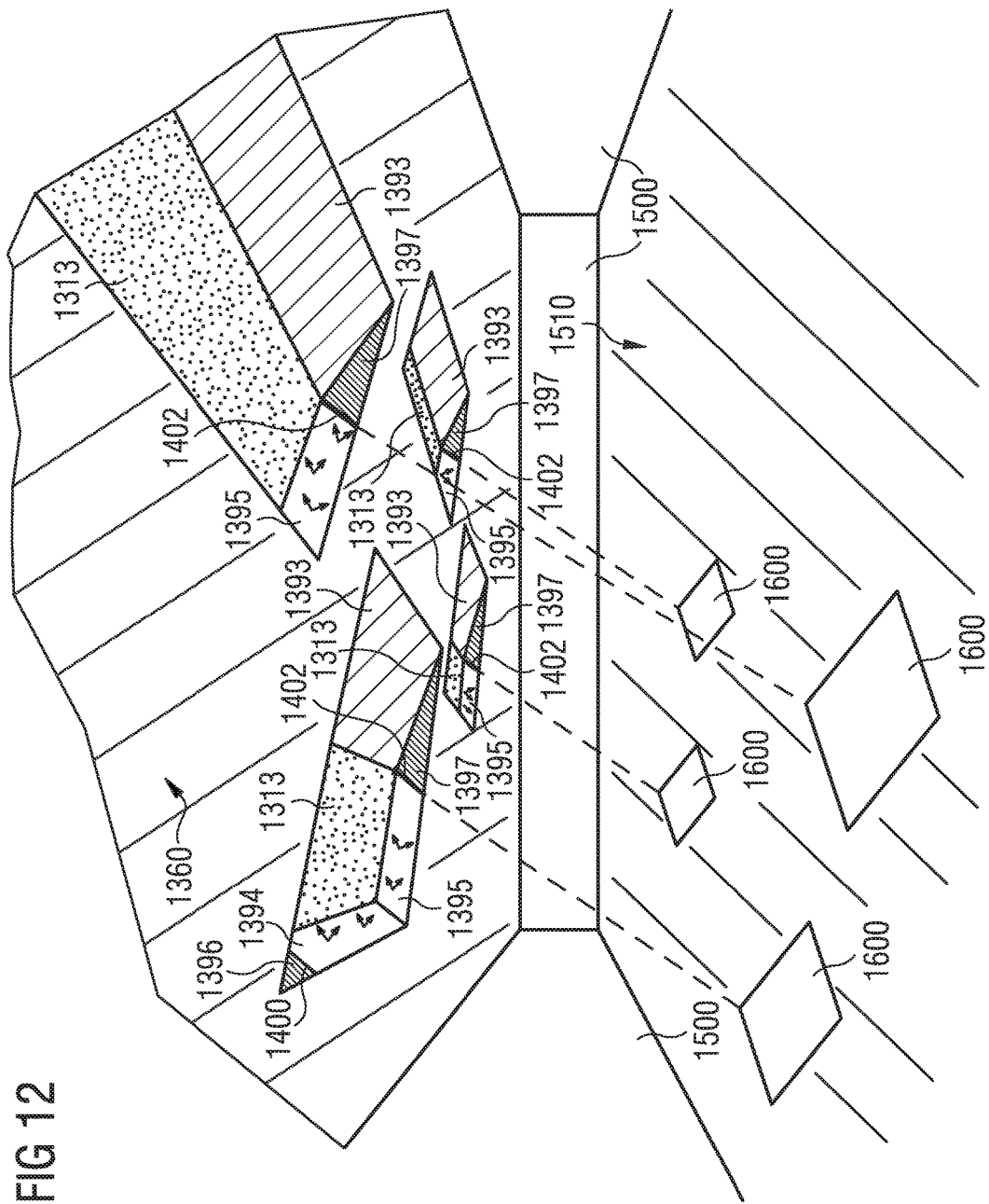
FIG. 12 is a schematic perspective view illustrating a room illuminated with a lighting unit comprising a plurality of lighting systems.

FIG. 12 illustrates the implementation of a plurality of lightwells for performing in combination a specific illumination effect. For example, such a plurality may be arranged in the form of specific products, such as (i) an integrated ceiling, for example configured as an integrated metal ceiling, comprising illumination devices and ceiling panels, or such as (ii) a composite lighting module, for example configured as a lighting tile. Applications may be the illumination of large rooms such as halls in larger buildings such as train or metro stations.

As shown in FIG. 12, a plurality (exemplarily four) lighting systems are installed into a ceiling 1360 and thus form in combination a ceiling unit. The lighting systems are of essentially identical configurations and are arranged essentially in identical spatial orientation within ceiling 1360, accordingly also the respective lightwells are arranged essentially in identical spatial orientation within ceiling 1360. Each lightwell comprises a bottom face 1313 of, for example, a planar diffused light generator in a rectangular shape. The lightwells further comprise illuminated side walls including illuminated screen sections 1394 and 1395 as well as non-illuminated side walls, including non-illuminated screen sections 1393 and 1394, and non-illuminated screen sections 1397 next to illuminated screen sections 1395. Illuminated in this context refers to direct illumination with non-diffuse light of the light source. Non-illuminated screen sections 1393 and 1397 may be illuminated by diffused light emitted from the diffused light generators.

For the lightwells shown in FIG. 12, contrast lines 1400 and 1402 are shown. From the perspective shown in FIG. 12, the five contrast lines 1400 and 1402 extend essentially in a parallel direction. The parallel appearance provides for the assumption of sunlight passing through bottom faces 1313.

The illumination of the room (delimited by ceiling 1360, walls 1500, and a floor 1510) is achieved in a top down direction by the diffused light of the diffused light generators as well as the scattered direct light originating from the illuminated side walls, specifically the illuminated screen sections 1394 and 1395. In addition, illumination of the room is achieved by the direct light that reaches floor 1510 or any object on floor 1510. In FIG. 12, the illuminated fields 1600 are essentially identical in shape and are displaced by some distance, which is essentially corresponding to the distance of the lighting systems installed in ceiling 1360 as well as the divergence of the beams. As the illuminated fields 1600 do not overlap, an observer within the room will only see one direct light source at a time when looking to the ceiling (at the most) and when being positioned in one of the corresponding divergent light beam portions passing through the lightwells.

In some embodiments, the divergence of the light beam might be large enough such that illuminated fields 1600 become larger and overlap with one or more neighboring fields 1600. Accordingly, the floor of the room may then be almost continuously illuminated. However in that situation, an observer may see multiple direct light sources when looking towards the ceiling, this circumstance being possible when the beams overlap at the level of the eyes.

In some embodiments, when the light beam passing through the diffused light generator is completely blocked, no direct light fields 1600 may be present on floor 1510.

The presence of the contrast lines 1402, the geometric lines of the light fields 1600, as well as the presence of, for example, at the most two lit up side walls of the lightwells will provide for the impression of sunlight illumination of the room.

The lighting systems may be adjusted such that, for example, none or some overlap between the divergent light beam portions within the room is achieved. For example, when each lighting system of the plurality of lighting systems is configured such that the direct non-diffused light of each of the lighting systems at least partly passes the screen structure (thereby generating a divergent light beam portion), the lighting systems may be arranged at a distance with respect to each other and/or provided with a divergence such that the divergent light beam portions of each of the neighboring lighting systems are non-overlapping over a propagation length of at least 1.5 m, for example at least 2.5 m, or even at least 4 m.

In some embodiments, neighboring lighting systems may be arranged at a distance with respect to each other and/or provided with a divergence such that the divergent light beam portions of the neighboring lighting systems overlap after a propagation length at a distance from the lighting unit that is smaller than 3 m, for example smaller than 2 m, or even smaller than 1 m.

Although FIG. 12 shows lightwells being configured essentially similar to the first type of lightwells disclosed in connection with FIGS. 1 to 6, also alternative embodiments such as disclosed in connection with FIGS. 7 to 11 may be implemented. Moreover, the ceiling of FIG. 12 may be considered a lighting unit comprising a plurality of lighting systems. However, the ceiling may also be built up of a plurality of lighting tiles or lighting system components that are set together to form the ceiling.

As already introduced, the perception of natural illumination from sky and sun relies on the one side on the light emitted by the illumination device, which should feature a direct-light component highly collimated with low CCT, mimicking the light from the sun, and a higher CCT diffused-light component, mimicking the illumination effect of the sky, such that the direct-light component is able to cast sharp parallel shadows of the objects illuminated by the illumination device and the diffused-light component gives a bluish color to such shadows. On the other side, the perception of natural illumination from sky and sun relies on the perception of infinite depth of the sky and sun images when directly viewing at the illumination device itself.

The capability of an observer to evaluate the distance of objects, and therefore the depth of the views that constitute a three-dimensional scenery, is based on multiple physiological and psychological mechanisms connected to focusing, binocular disparity and convergence, motion parallax, luminance, size, contrast, aerial perspective, etc. Some mechanisms may gain significance compared to the others according to both the observing conditions (e.g. whether the observer is moving or still, watching with one or two eyes, etc.) as well as the characteristics of the scenery, these latter depending, for example, on whether objects with known size, distance or luminance are present, serving as a reference to evaluate how distant the observed element of the scenery is. Notably, these mechanisms hold both in the case of real images and of virtual images. More specifically, visual discomfort or eye strain may arise when conflicts exist between two or more different image planes simultaneously perceived at different depths by an observer because of one single visual perception cue, or two or more competing different high-level visual perception cues.

In position and/or in embodiments, in which the sun imitation is not seen by an observer, the inventors realized that the visual perception of depth is determined primarily on indications of the type of propagating light. Thus, cues such as accommodation, binocular convergence, motion parallax, aerial perspective may less important than the perspective effect of sunlight generating parallel contrast lines converging at infinity.

In some embodiments of the herein disclosed lighting systems, multiplicity of those lighting systems may provide for repeating light shadow transitions, e.g. contrast lines 400 and 402 or 802 and 804 or 902 shown in FIGS. 3, 8, and 9 respectively.

Arranging identical or at least similar lighting systems in a pattern and oriented such that those contrast lines run parallel will provide for a perception of the observer that the room is naturally illuminated from sky and sun. Furthermore, a plurality of lighting systems may be integrated in one large box, each lighting system having its own box sections and each box section being optically coupled to the room via its own lightwell but being optically not coupled to neighboring lighting systems.

In a plurality of lighting systems that are arranged to create in combination perspective impression of the imitated sunlight, each lighting system 1, 900 may be configured such that the direct non-diffused light of each of the lighting systems 1, 900 is completely blocked by the screen structure 14, 914. This allows that an observer will not be able see multiple sun imitations at once.

In some embodiments of a plurality of lighting systems that are arranged to create in combination perspective impressions of the imitated sunlight, the screen structure may be positioned and dimensioned such that—although the direct non-diffused light of each of the lighting systems 1, 900 may not be completely blocked by the screen structure 14, 914—at least within a selected range of positions, only a single sun imitation may be visible to an observer.

In some embodiments of a plurality of lighting systems that are arranged to create in combination perspective impressions of the imitated sunlight, the lighting systems are configured such that the divergent light beam portions 53, 953 do not overlap within the room, thereby ensuring that there is no position from which two imitated suns could be seen.

In some embodiments, box 16 of the lighting system is internally coated by an internal layer, for example made of a material capable of absorbing incident luminous radiation. Such a material is, for example, a material with black color and coefficient of absorption higher than 70%, e.g. higher than 90%, or 95%, or even higher than 97% in the visible range. The internal layer absorbs incident radiation that comes, for example, directly from first light source 2, or from reflection and/or scattering processes by diffused light generator 20, or from the room 30 through lamp shade-like structure 10 or from screen structure 14, thus ensuring a dark background behind—from the view of the observer—diffused light generator 20. This may ensure for diffused light generator 20 to have the desired color features, e.g. a color virtually identical of that of the sky when diffused light generator 20 is a Rayleigh scattering panel. Moreover, this may prevent the occurrence of spatial variation in color and luminance of diffused light generator 20, which will be perceived as being not natural by the observer.

Preferably, box 16 is internally coated by the internal layer in its entirety, with the exception of the surface of diffused light generator 20. In other words, box 16 defines a sort of dark chamber, wherein the term "dark" relates to a condition of little illumination and/or to the capability of absorbing light, thereby making the box inside barely visible though diffused light generator 20 despite light being able to in principle enter/exit the dark box 16 via lamp shade-like structure 10.

However, in some embodiments (e.g. when the main constraint is to increase the device energy efficiency and thereby, for example, to maximize the lumen/Watt feature), it is possible that only a portion of dark box 16 is coated by light absorbing material. For example, the coated portion may be limited to those portions corresponding to points on the inner surface of dark box 16 which can be reached by straight lines crossing diffused light generator 20 and light passage 46. In this case, an observer that looks at the inner surface of the dark box 16 through light passage 46 and the semi-transparent diffused light generator 20 may nevertheless see only a dark background beyond the panel.

As herein mentioned, optical elements upstream of diffused light generator 20 may be used to fold the beam path of the incident light beam. However, for illustration purposes, the respective illustration and description use non-folded optical configurations.

As mentioned herein, the bottom unit comprises the diffused light generator and, for example, additional elements such as some illumination devices to illuminate the diffused light generator from the side. Assuming that those additional elements are not present, one could consider the diffused light generator to be the bottom unit.

Furthermore, the presented concepts are not restricted to be used in indoor spaces only. In some embodiments, lighting system 1 is used as a system for outdoor day-like illumination during night time. Then, lighting system 1 would be coupled to an outdoor environment, i.e. an environment equivalent to a room, the walls of which are either black or arranged at an infinitely large distance.

In the following, various aspects and exemplary embodiments of lighting systems as described herein and in particular as recited in the claims are summarized:

Aspect A1. A lighting system (1000) comprising
a light source (1002) for providing a light beam (1003) of directed non-diffused light with a first correlated color temperature along a main light beam direction (1004); and
a lamp shade-like structure (1010) comprising a planar front cover (1011) with an aperture (1080), a bottom unit (1012), and a screen structure (1014), wherein the bottom unit (1012) is positioned to be illuminated from the light source (1002) at one side (1012A), and the bottom unit (1012) and the screen structure (1014) define a light passage (1046) extending from an opposite side (1012B) of the bottom unit (1012) to the aperture (1080), wherein
the bottom unit (1012) comprises a diffused light generator (1020) for generating diffused light at a second correlated color temperature, which is larger than the first correlated color temperature, is at least partially transparent for the directed non-diffused light of the light beam (1003), and is configured such that at least a light beam portion of the light beam (1003) enters the light passage (1046); and wherein the diffused light generator (1020) is inclined with respect to the planar front cover (1011).

Aspect A2. The lighting system (1000) of aspect A1, wherein the tilt angle ($\alpha_t$) between the normal of the diffused light generator (20) and the normal of the planar front cover (1111) is in the range from 5° to 80°, for example in the range from 10° to 60° such as 30°, 40°, or 50°.

Aspect A3. The lighting system (1000) of aspect A1 or aspect A2, wherein, in a cross-section along a plane extending orthogonal to the diffused light generator (1020) and through the light source (1020),
prior incidence on the diffused light generator (20), the main light beam direction (1104) is inclined with respect to the normal direction of the planar front cover (1111) by an incident angle ($\alpha_i$) set in an angular range from 10° to 80° such as 40°, 50°, or 60°, and/or
the normal direction of a plane defined by the diffused light generator (20) is inclined with respect to the normal direction of the planar front cover (1111) by a tilt angle ($\alpha_t$) set small than the incident angle, for example set in an angular range from 15° to 75° such as 40°, 50°, or 60°.

Aspect A4. The lighting system (1000) of aspect A3, wherein the screen structure comprises a lit-up face that, in the cross-section, is inclined with respect to the main light beam direction (1004) at a first screen angle ($\alpha_s$) set in an angular range from 0° to 90°, for example at the incident angle ($\alpha_i$).

Aspect A5. The lighting system (1000) of aspect A3 or aspect A4, wherein the screen structure (1014) comprises a not directly illuminated surface that, in the cross-section, is inclined with respect to the main light beam direction (1104) at a second screen angle being the size of the incident angle ($\alpha_i$) or larger; and/or
wherein the normal direction of not directly illuminated surface, in the cross-section, is inclined with respect to the normal direction of the planar front cover (1011) within the range from the tilt angle ($\alpha t$) to 90°.

Aspect A6. The lighting system (1100) of any one of claim aspect A1 to aspect A5, wherein, in a cross-section along a plane extending orthogonal the diffused light generator (1120) and through the light source (1002), the diffused light generator (1120) essentially borders to the planar front cover (1111).

Aspect A7. The lighting system (1000) of any one of aspect A1 to aspect A6, wherein the light source (1002) is displaced with respect to the bottom unit (1012) in a direction parallel to the planar front cover (1011) and/or has a distance to the planar front cover (1011) comparable to or larger than the distance from the bottom unit (1012) to the planar front cover (1011).

Aspect A8. The lighting system (1000) of any one of aspect A1 to aspect A7, wherein the lighting system (1000) is further configured according to any one of the lighting systems of the recited claims.

Aspect A9. The lighting system (1000) of any one of aspect A1 to Aspect A8, wherein a propagation direction of the directed non-diffused light is essentially constant across the light beam (1003).

Moreover, in some embodiments of the lighting systems disclosed herein, the diffused light generator (20) receives light from a second light source to be scattered within the diffused light generator (20) to provide for scattered light (500).

Although the preferred embodiments have been described herein, improvements and modifications may be incorporated without departing from the scope of the following claims.

What is claimed is:

1. A lighting system, comprising:
a light source for providing a light beam of directed non-diffused light with a first correlated color temperature along a main light beam direction, wherein a propagation direction of the directed non-diffused light is modified across the light beam and is essentially parallel to the main light beam direction in an inner area and is increasingly inclined with respect to the main light beam direction with increasing distance from the inner area; and
a lamp shade-like structure comprising a bottom unit to be illuminated from the light source at one side and a screen structure provided at another side, the bottom unit and the screen structure defining a light passage, wherein:
the bottom unit comprises a diffused light generator for generating diffused light at a second correlated color temperature, which is larger than the first correlated color temperature;
the bottom unit is at least partially transparent for the directed non-diffused light of the light beam;
the bottom unit is configured such that at least a divergent light beam portion of the light beam enters the light passage;
the screen structure is spatially oriented with respect to the main light beam direction of the divergent light beam portion to be illuminated by at least a part of the divergent light beam portion, thereby providing an illuminated screen section acting as a scattered light source; and
the screen structure comprises a non-illuminated screen section that is not directly illuminated by the divergent light beam portion during operation of the light source.

2. The lighting system of claim 1,
wherein, during operation of the lighting system, a shadow/light transition line is formed between the non-illuminated screen section and the illuminated screen section.

3. The lighting system of claim 1, wherein the screen structure is configured as a funnel-like structure that diverges in a downstream direction within the light passage of the screen structure more than the divergent light beam portion.

4. The lighting system of claim 1, wherein the non-illuminated screen section is arranged at one azimuthal side or both azimuthal sides of the illuminated screen section.

5. The lighting system of claim 1, wherein the screen structure comprises, at least within the illuminated screen section, at least one of:
- a light scattering surface having a low absorption property with respect to one or more of the directed non-diffuse light of the divergent light beam portion, the diffused light of the diffused light generator, the diffused light of the screen structure itself; and
- a light scattering surface featured by non-isotropic diffuse reflectance.

6. A lighting system comprising:
- a light source for providing a light beam of directed non-diffused light with a first correlated color temperature along a main light beam direction, wherein a propagation direction of the directed non-diffused light is modified across the light beam and is essentially parallel to the main light beam direction in an inner area and is increasingly inclined with respect to the main light beam direction with increasing distance from the inner area; and
- a lamp shade-like structure integrated in a ceiling or wall of a building and forms a lightwell, the lamp shade-like structure comprising a bottom unit to be illuminated from the light source at one side and a screen structure provided at another side, the bottom unit and the screen structure defining a light passage, wherein:
- the bottom unit comprises a diffused light generator for generating diffused light at a second correlated color temperature, which is larger than the first correlated color temperature;
- the bottom unit is at least partially transparent for the directed non-diffused light of the light beam;
- the bottom unit is configured such that at least a divergent light beam portion of the light beam enters the light passage; and
- the screen structure is spatially oriented with respect to the main light beam direction of the divergent light beam portion to be illuminated by at least a part of the divergent light beam portion, thereby providing an illuminated screen section acting as a scattered light source.

7. The lighting system of claim 6, wherein the lightwell extends from an aperture into the ceiling or wall; and
wherein a bottom face of the lightwell is formed by the diffused light generator.

8. The lighting system of claim 7, wherein an angle of the side wall forming the non-illuminated screen section with respect the main light beam direction of the divergent light beam portion is larger than the angle of the side wall forming the illuminated screen section with respect to the main light beam direction of the divergent light beam portion.

9. The lighting system of claim 1, wherein the light passage is delimited by the bottom unit in a preset geometrical shape.

10. The lighting system of claim 1, wherein the diffused light generator is configured to substantially transmit light in the visible range and to scatter more efficiently the short-wavelengths components in respect to the long-wavelength components of the light beam.

11. The lighting system of claim 1, wherein the light source is a light source having a divergence in the range from 5° to 50°, having two different divergences in two orthogonal directions that are adapted for illumination of a rectangular diffused light generator.

12. The lighting system of claim 1, wherein the light source and the density of the particle distribution across the diffused light generator are selected such that the product between the density and the illuminance provided by the light source during operation of the lighting system on the diffused light generator is substantially constant on the diffused light generator; and
wherein the diffused light generator has a panel shape and/or comprises a film applied onto a substrate.

13. The lighting system of claim 1, further configured as a composite lighting module.

14. The lighting system of claim 1, wherein:
- the divergent light beam portion is blocked by the screen structure such that only scattered light exits the light passage of the lamp shade-like structure; or
- the illuminated screen section is surrounded by the non-illuminated screen section or borders to the bottom unit and the non-illuminated screen section.

15. The lighting system of claim 1, wherein the screen structure comprises at least one of:
- at least one face that faces towards the divergent light beam portion; and
- at least one face that faces away from the divergent light beam portion.

16. The lighting system of claim 1, wherein the diffused light generator comprises a matrix of a first material wherein first particles of a second material are dispersed, said first and second materials having, respectively, a first and a second refractive indexes, said first particles having diameters such that the product of said diameters times the first refractive index is in the range 5 nm to 350 nm.

17. The lighting system of claim 1, wherein the light source comprises a collimation optics that extends in a plane orthogonal to the main light beam direction over an area that is smaller than the extension of the diffused light generator when projected onto the plane orthogonal to the main light beam direction.

18. The lighting system of claim 6, wherein a side wall of the lightwell extends from the bottom face to the aperture thereby forming the illuminated screen section or the non-illuminated screen section.

19. The lighting system of claim 7, wherein the screen structure is asymmetric with respect the main light beam direction of the divergent light beam portion and/or with respect to the aperture.

20. A lighting system, comprising:
- a light source for providing a light beam of directed non-diffused light with a first correlated color temperature along a main light beam direction, wherein a propagation direction of the directed non-diffused light is modified across the light beam and is essentially parallel to the main light beam direction in an inner area and is increasingly inclined with respect to the main light beam direction with increasing distance from the inner area; and
- a lamp shade-like structure comprising a bottom unit to be illuminated from the light source at one side and a screen structure provided at another side, the bottom unit and the screen structure defining a light passage, wherein:
- the bottom unit comprises a diffused light generator for generating diffused light at a second correlated color temperature, which is larger than the first correlated color temperature;
- the bottom unit is at least partially transparent for the directed non-diffused light of the light beam;
- the bottom unit is configured such that at least a divergent light beam portion of the light beam enters the light passage;

the screen structure is spatially oriented with respect to the main light beam direction of the divergent light beam portion to be illuminated by at least a part of the divergent light beam portion, thereby providing an illuminated screen section acting as a scattered light source; and an extension of the screen structure in an azimuthal direction around the main light beam direction of the divergent light beam portion, as it enters the light passage, or the spatial orientation of the screen structure with respect to the divergent light beam portion is selected such that the illuminated screen section extends partly in azimuthal direction around the main light beam direction when the divergent light beam portion enters the light passage and increases or decreases during propagation within light passage to maintain the natural sunlight impression.

* * * * *